(12) United States Patent
Jain et al.

(10) Patent No.: US 11,509,635 B1
(45) Date of Patent: Nov. 22, 2022

(54) DATA INCUBATOR FOR SECURE DATA PROCESSING IN SERVICE-PROVIDER NETWORKS

(71) Applicant: Amazon Technologies, Inc., Seattle, WA (US)

(72) Inventors: Ripul Jain, Vancouver (CA); Erick Ribeiro, Burnaby (CA); Oren Weiss, Vancouver (CA); Kevin Stessens, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 17/118,498

(22) Filed: Dec. 10, 2020

(51) Int. Cl.
| | | |
|---|---|---|
| *H04L 29/06* | (2006.01) | |
| *H04L 9/40* | (2022.01) | |
| *G06F 21/64* | (2013.01) | |
| *H04L 9/06* | (2006.01) | |
| *G06F 21/60* | (2013.01) | |

(52) U.S. Cl.
CPC ........ *H04L 63/0428* (2013.01); *G06F 21/602* (2013.01); *G06F 21/64* (2013.01); *H04L 9/0618* (2013.01)

(58) Field of Classification Search
CPC . H04L 63/0428; H04L 9/0618; G06F 21/602; G06F 21/64
USPC .......................................................... 713/153
See application file for complete search history.

(56) References Cited

U.S. PATENT DOCUMENTS

| | | | | |
|---|---|---|---|---|
| 7,330,968 | B2* | 2/2008 | Kimura ................. | H04L 9/0891 |
| | | | | 713/153 |
| 7,398,393 | B2* | 7/2008 | Mont .................... | H04L 9/3073 |
| | | | | 713/168 |
| 7,418,511 | B2* | 8/2008 | Takechi .............. | H04L 63/0428 |
| | | | | 709/227 |
| 9,424,438 | B2* | 8/2016 | Lin ......................... | H04L 63/06 |
| 10,129,211 | B2* | 11/2018 | Heath .................... | G06Q 30/02 |
| 10,867,068 | B2* | 12/2020 | Chen ...................... | H04L 69/12 |
| 2005/0209975 | A1* | 9/2005 | So ....................... | H04L 63/0853 |
| | | | | 705/71 |
| 2010/0169638 | A1* | 7/2010 | Farris .................. | H04L 63/0471 |
| | | | | 713/153 |
| 2011/0055547 | A1* | 3/2011 | Lee ........................ | H04L 63/102 |
| | | | | 713/150 |
| 2016/0012272 | A1* | 1/2016 | Wong .................... | H04B 5/0031 |
| | | | | 382/124 |
| 2016/0182457 | A1* | 6/2016 | Karaoguz ............. | H04L 67/104 |
| | | | | 713/153 |
| 2017/0109542 | A1* | 4/2017 | Kang .................. | G06F 21/6245 |
| 2020/0374117 | A1* | 11/2020 | Wei ........................... | H04L 9/30 |

* cited by examiner

*Primary Examiner* — Amare F Tabor
(74) *Attorney, Agent, or Firm* — Lee & Hayes, P.C.

(57) ABSTRACT

Various techniques for processing sensitive data in an isolated incubator system within a service-provider network are described. The incubator system, for instance, is isolated from a client system in the service-provider network. In an example method, the incubator system receives an indication of an operation, and first encrypted data, from the client system. The incubator system converts the first encrypted data to plaintext and performs the operation. The incubator system converts the processed data into second encrypted data and provides the second encrypted data to the client system. Thus, the incubator system performs the operation on the data without exposing the data to the client system in the plaintext format.

20 Claims, 12 Drawing Sheets

US 11,509,635 B1

DATA INCUBATOR FOR SECURE DATA PROCESSING IN SERVICE-PROVIDER NETWORKS

BACKGROUND

Various web-based applications receive confidential data. For example, applications associated with consumer websites regularly receive payment information (e.g., a credit card number) corresponding to a customer paying for a particular product offered for sale on the website. In some examples, back-end clients hosting the consumer websites pre-process the payment information before providing the payment information to an external party, such as an external banking partner that can execute the payment. For instance, a back-end client may confirm that payment information is in a particular format before forwarding the information to the external banking partner. Pre-processing can prevent the client from forwarding improper information to the external banking partner, which can prevent the external banking partner from rejecting the payment information. For instance, if the user has erroneously input a credit card number with too few digits, the pre-processing by the back-end client could prevent the back-end client from unnecessarily transmitting the improper credit card number to the external banking partner.

However, these back-end clients have a significant attack surface. In various examples, the back-end clients are connected to the public Internet, which exposes the clients to a significant risk of data leakage. Due to the inherent insecurity of clients hosting websites provided over the Internet, there is a need to provide a more secure environment for handling confidential user data obtained by websites.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
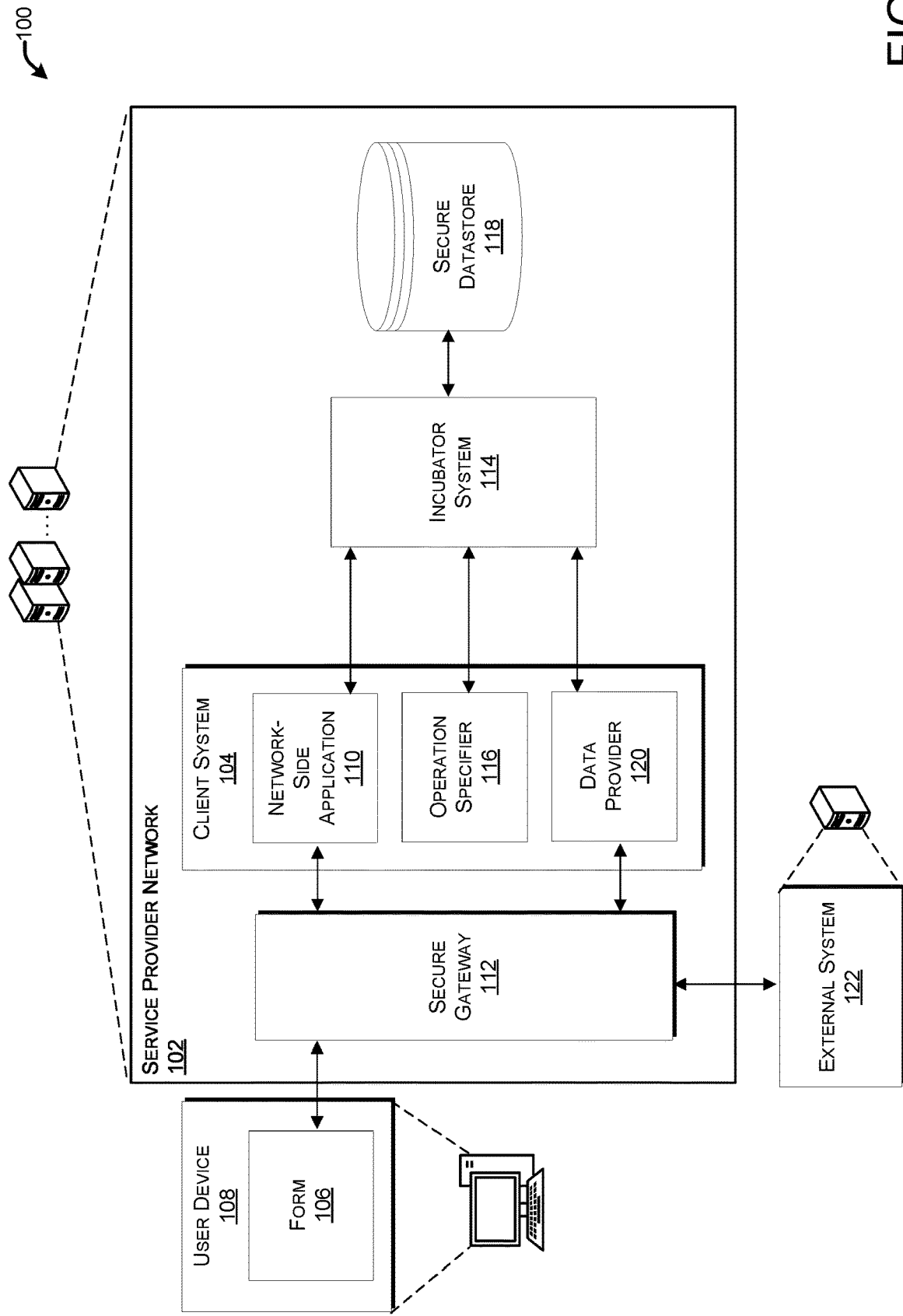
FIG. 1 illustrates an example computing environment for secure handling of sensitive data.

This disclosure describes various techniques for securely validating, transforming, and storing sensitive data in a service-provider network. In various implementations, a client system interacts with sensitive data via an incubator system, which is isolated from the client system. The incubator system performs operations on the sensitive data without exposing the sensitive data to the client system in a plaintext format. Accordingly, the sensitive data is protected from data leaks by the client system.

In various examples, the client system is hosted by the service-provider network and provides a web-based form on a user device to receive sensitive data from a user. The client system may provide a web site that can be accessed by the user via a web browser operating on the user device. For example, the user may apply for a credit card by entering the user's name, contact information, social security number, and other types of confidential information into the web-based form. The sensitive data is encrypted upon entering the service-provider network.

Traditionally, the client system would validate, transform, or otherwise perform operations on the sensitive data prior to forwarding the sensitive data to an external source. For example, the client system would confirm that the name entered into the form omits numbers or non-letter characters, the client system could confirm that the zip code and state entered into the form are consistent, the client system could confirm that the social security number entered into the form is in a valid format (e.g., 9 digits), and so on. The client system may have also converted the sensitive data into a format suitable for consumption by an external system, such as a server of a banking partner configured to process the sensitive data for the credit card application.

In these traditional implementations, the client system would convert the sensitive data into plaintext in order to perform the validation, transformation, and other operations on the sensitive data. That is, the client system would decrypt the sensitive data for further processing. However, the plaintext version of the sensitive data handled by the client system may create some security risks. For example, the sensitive data could be leaked by the client system or otherwise accessed by a malicious actor.

These security risks could be reduced by increasing the security of the client system through firewalls or other techniques. However, in some service-provider networks, multiple client systems could be handling sensitive data at the same time. Addressing the security of the client systems individually within a service-provider network may be inefficient and imperfect.

Various implementations described herein include an incubator system that protects and handles sensitive data for one or more client systems in a service-provider network. The incubator system represents a centralized, isolated entity that is configured to perform operations on sensitive data without exposing the sensitive data to the client system(s) in plaintext format. The incubator system provides an interface by which the client system(s) can specify operations (e.g., transformations, validations, storage, encryptions, and others) on the sensitive data. However, the incubator system keeps the plaintext data from being exposed to the client system(s) in the service-provider network. When the sensitive data is ready for transmission outside of the service-provider network, the incubator system provides an encrypted copy of the sensitive data to the client system(s). The client system(s) are then able to transmit the processed sensitive data to the external system outside of the service-provider network, without handling the sensitive data in an unprotected, plaintext format.

Implementations of the present disclosure are practical applications in the technical fields of computer security and cloud computing. For example, the incubator system provides a secure environment for validating, transforming, encrypting, and storing sensitive data within a cloud-based network. A client system within the cloud-based network may be vulnerable to data leakage. In some cases, the incubator system can handle the sensitive data without exposing the sensitive data to the client system in plaintext. Accordingly, the sensitive data can be processed, but remain protected, by the incubator system.

Various examples of the present disclosure will now be described with reference to the accompanying figures.

FIG. 1 illustrates an example computing environment 100 for secure handling of sensitive data. The environment 100 includes a service-provider network 102. The service-provider network 102 includes a client system 104. In various implementations, the computing environment 100 enables secure handling of sensitive data. In some implementations, the sensitive data is pre-processed in a secure environment within the service-provider network 102 before being forwarded to a destination outside of the service-provider network 102. In various examples, a plaintext version of the sensitive data is inaccessible to the client system 104 during processing. Thus, the environment 100 prevents unauthorized leakage of the plaintext version of the sensitive data from the client system 104.

In various implementations, the client system 104 may provide a form 106 that can be output on a user device 108. In various examples, the client system 104 hosts a website that is accessible by a web browser operating on the user device 108. In some cases, the client system 104 hosts a web-based application and/or a mobile application that are accessible through the user device 108. For example, the website is a marketplace via which users can purchase products and services from one or more organizations. In some cases, the website is an intermediary between the user and external vendors or partners, which can provide the products and services. Via the user device 108, users may also access the marketplace via the web-based application and/or the mobile application.

The service-provider network 102, in some cases, is a cloud provider network, which refers to a pool of network-accessible computing resources (such as compute, storage, networking resources, applications, and services), which may be virtualized, shared, and/or bare-metal. The service-provider network 102 can provide convenient, on-demand network access to a shared pool of configurable computing resources that can be programmatically provisioned and released in response to customer commands. These resources can be dynamically provisioned and reconfigured to adjust to variable loads. Cloud computing can thus be considered as both the applications delivered as services over a publicly accessible network (e.g., the Internet, a cellular communication network, or the like) and the hardware and software in service-provider data centers that provide those services.

The service-provider network 102 can be formed as a number of regions, where a region is a separate geographical area in which the service-provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. In various examples, availability zones within a region are positioned geographically far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service-providers, telecommunications providers) and securely connected (e.g. via a virtual private network (VPN) or direct connection) to the availability zones. Each region can operate two or more TCs for redundancy. Regions are connected to a global network which includes private networking infrastructure (e.g., fiber connections controlled by the cloud provider) connecting each region to at least one other region. This compartmentalization and geographic distribution of computing hardware enables the cloud provider network to provide low-latency resource access to customers on a global scale with a high degree of fault tolerance and stability.

In various examples, the service-provider network 102 includes a fleet of hosts. As used herein, the term "host," and its equivalents, can refer to one or more physical devices (e.g., one or more physical servers) configured to provide computing resources. The hosts within the service-provider network 102 may be configured to accommodate virtualized resources within their respective computing resources.

The service-provider network 102 may include at least one internal network by which data can be securely and rapidly transferred between various hosts, virtualized resources, and/or other components within the service-provider network 102. A "component" of the service-provider network 102 can be, for example, software (e.g., a VM) executed by one or more hosts of the service-provider network 102, at least one hardware resource (e.g., a processor) of one or more hosts of the service-provider network 102, or the like. The internal network(s) can include one or more wired networks, one or more wireless networks, or a combination thereof. In some cases, the internal network(s) may include an optical fiber network configured to provide high-speed data communication between various entities (e.g., hosts, virtualized resources, devices, routers, switches, and the like) within the service-provider network 102. In various implementations, data can be transmitted over the internal network(s) in the form of packets (e.g., Internet Protocol (IP) packets), segments (e.g., Transmission Control Protocol (TCP)) segments, some other communication protocol, or a combination thereof.

The client system 104 is implemented by one or more hosts in the service-provider network 102. For example, the client system 104 is a component of the service-provider network 102. In various examples, at least a portion of computing resources in the service-provider network 102 are configured to store and/or execute the client system 104. As used herein, the terms "computing resource," "compute resources," "resources," and their equivalents, can refer to at least one of processing resources, memory resources, cache resources, service resources, or the like, of one or more hosts in a service-provider network. The term "processing resource," and its equivalents, may refer to the availability of at least a portion of one or more physical processors (e.g., a portion of CPUs) within a host to process data. The terms "memory resource," "storage resource, and their equivalents, may refer to the availability of at least a portion of one or more physical memory systems (e.g., Random Access Memory (RAM)) within a host to store data. The term "cache resource," and its equivalents, can refer to the availability of a capacity in a RAM and/or in-memory engine within a host to cache data at least temporarily. The term "service resource," and its equivalents, may refer to the availability of one or more services hosted by a host to perform requested operations. The client system 104 includes hardware, software, or a combination thereof. For example, the client system 104 is a virtual machine (VM) instance hosted by computing resources of the service-provider network 102.

In particular implementations, the client system 104 is configured to provide the form 106 to a user device 108. The form 106, for instance, may be a user interface that enables a user to enter data, which can be sent to the service-provider network 102 for further processing. In various examples, the form 106 is visually displayed to the user by the user device 108. The form 106 may be included in a web page displayed by a web browser operating on the user device 108. The form 106 may include one or more user interface elements through which the user can enter the data. In some examples, the form 106 includes a text box that is configured to receive text entered by the user, a radio button that is configured to receive a selection of a category (e.g., gender) by the user, a select box that enables the user to select one or more applicable features, a button that enables the user to submit the data entered into the form 106 to the service-provider network 102, or the like.

In various examples, the client system 104 includes a network-side application 110 that provides the form 106 to the user device 108. The network-side application 110 includes software and/or hardware configured to transmit data indicative of the form 106 to the user device 108. In various examples, the network-side application 110 includes a web application that is executed by one or more hosts within the service-provider network 102. The host(s) executing the web application transmit the data indicative of the form 106 to the user device 108 and receive data entered into the form 106 from the user device 108. Although not illustrated in FIG. 1, the service-provider network 102 and the user device 108 are connected via one or more communication networks, such as at least one wireless network (e.g., WIFI, 3GPP Radio Access Network (RAN), etc.), at least one wired network (e.g., a wired network transmitting electrical and/or optical signals), at least one Wide Area Network (WAN) (e.g., the Internet), at least one cellular core network (e.g., an Evolved Packet Core (EPC), $5^{th}$ Generation Core (5GC), etc.), or a combination thereof.

In various cases, a user of the user device 108 enters sensitive data into the form 106. The sensitive data includes data that is not publicly available, for instance. In some examples, the sensitive data includes personally identifying information, such as data indicating a name, address, contact information (e.g., phone number, e-mail address, etc.), citizenship, employer, or social security number (SSN). In some cases, the sensitive data includes confidential information associated with the user, such as financial information (e.g., credit card numbers, SSN, financial account numbers, income levels, etc.), medical information (e.g., lab results, medications, medical history, genetic information, etc.), and other user-identifying information. In some cases, the sensitive data includes confidential information associated with another entity, such as a friend, family member, patient, government, client, or employer of the user. For example, the sensitive data may include data indicating a trade secret of an employer of the user, data associated with a governmental security clearance level, or the like.

The service-provider network 102 includes a secure gateway 112 that intercepts data traffic into the service-provider network 102. The secure gateway 112 is implemented by computing resources of the service-provider network 102 and includes hardware, software, or a combination thereof. In some cases, the secure gateway 112 is a component of the service-provider network 102. For example, the secure gateway 112 is a VM hosted by computing resources of the service-provider network 102. In various implementations, the secure gateway 112 is configured to encrypt data that is transmitted and/or stored within the service-provider network 102. As used herein, the term "encrypt," and its equivalents, refers to a process of translating data from one format (e.g., an unencoded format) into an encoded format. In various cases, the encoded format is referred to as "ciphertext." Unencoded data, which has not been encrypted, may be referred to as being in "plaintext." In various examples, an entity (such as the secure gateway 112) encrypts data using at least one encryption key. An encryption key is a parameter that defines the translation of data from the one format into the encoded format.

In some examples, the secure gateway 112 also receives data traffic being transmitted outside of the service-provider network 102. The secure gateway 112 may be configured to at least partially decrypt the data traffic being transmitted outside of the service-provider network 102. As used herein, the term "decrypt," and its equivalents, refers to a process of translating data from an encoded format into another format (e.g., an unencoded format), such as a plaintext format. In various examples, an entity (such as the secure gateway 112) encrypts data using at least one decryption key. A decryption key is a parameter that defines the translation of data from the encoded format into the other format.

Various cryptographic techniques can be utilized in accordance with the features described in this disclosure. For example, data can be encrypted and decrypted via a symmetric key, wherein the encryption key and the decryption key are equivalent. In some cases, data can be encrypted and decrypted via asymmetric keys, wherein the encryption key and the decryption key are different. Cryptographic hash functions (CHFs) are examples of cryptographic techniques. Examples of cryptographic techniques include the Data Encryption Standard (DES), Advanced Encryption Standard (AES), Elliptic Curve Cryptography (ECC), Rivest-Shamir-Adleman (RSA), Secure Hash Algorithm (SHA)-1, SHA-2, SHA-3, BLAKE, BLAKE2, BLAKE3, WHIRLPOOL, MD2, MD4, MD5, MD6, Temporal Key Integrity Protocol (TKIP), Rivest cipher 4 (RC4), variably modified permutation composition (VMPC), blowfish, Twofish, Threefish, Tiny Encryption Algorithm (TEA), Extended TEA (XTEA), Corrected Block TEA (XXTEA), Diffie-Hellman exchange (DHE), elliptic curve DHE, supersingular isogeny Diffie-Hellman (SIDH) key exchange, and so on. Any suitable encryption or decryption technique can be used in accordance with implementations of this disclosure.

In various implementations, the secure gateway 112 receives the sensitive data from the user device 108, encrypts the sensitive data according to a first encryption scheme, and forwards the encrypted sensitive data to the network-side application 110. The secure gateway 112 encrypts the sensitive data using one or more first encryption keys, for example. As a result, the client system 104 receives the sensitive data from the user device 108 in an encrypted format (e.g., in ciphertext). In various implementations, the client system 104 lacks one or more decryption keys configured to decrypt the encrypted sensitive data. Accordingly, the client system 104 is unable to access the sensitive data in an unencrypted format (e.g., in plaintext).

The client system 104 forwards the encrypted sensitive data to an incubator system 114. The incubator system 114 is implemented by computing resources of the service-provider network 102 and includes hardware, software, or a combination thereof. In various examples, the incubator system 114 is a component of the service-provider network 102. For example, the incubator system 114 is a VM hosted by computing resources of the service-provider network 102. In the example illustrated in FIG. 1, both the client system 104 and the incubator system 114 are in the service-provider network 102.

In various implementations, the incubator system 114 is isolated from the client system 104. For example, operations of the incubator system 114 are sandboxed from operations of the client system 104. As used herein, the term "sandboxed," and its equivalents, refers to software programs that are executed in different hardware environments within one or more hosts. For example, the operations of the incubator system 114 are configured to utilize one set of memory resources and the operations of the client system 104 are configured to utilize another set of memory resources, which may or may not be in the same host. According to some examples, the client system 104 and incubator system 114 are different virtualized machines executed by one or more hosts in the service-provider network 102. In some examples, the operations of the incubator system 114 are performed on different computing resources than the operations of the client system 104. In various implementations, data associated with the incubator system 114 is inaccessible by the client system 104. For example, at least one encryption key, at least one decryption key, and/or other data utilized by the incubator system 114 in processing the sensitive data are inaccessible by the client system 104.

In some examples, the client system 104 is within a first private network and the incubator system 114 is within a second private network, such that the client system 104 is network-level isolated from incubator system 114. In various examples, the first private network and the second private network are virtual private networks. According to some cases, the first private network and the second private networks are within the service-provider network 102. Although not illustrated in FIG. 1, in some implementations, the first private network and the second private networks are connected to the service-provider network 102 but hosted outside of the service-provider network 102. Data may be transmitted between the first private network and the second private network, such as communications between the client system 104 and the incubator system 114, through secure communication tunnels. Accordingly, if the client system 104 and the first private network are compromised, the incubator system 114 and the second private network can remain secured.

The client system 104 also includes an operation specifier 116, which is configured to specify one or more operations to be performed on the sensitive data. The operation specifier 116 provides indications of the operation(s) to the incubator system 114. The operation(s) may include at least one validation operation, at least one transformation operation, at least one encryption operation, at least one decryption operation, at least one storage operation, or any combination thereof. As used herein, the term "validation operation," and its equivalents, may refer to a process of confirming whether data is appropriate for further processing. For example, a validation operation may include determining whether the sensitive data is in a predetermined format. As used herein, the term "transformation operation," and its equivalents, may refer to a process of translating data from a first format to a second format. As used herein, the term "encryption operation," and its equivalents, may refer to a process of encrypting data. In some cases, the encryption operation includes encrypting data according to a second encryption scheme, which may be different than the first encryption scheme used by the secure gateway 112. For example, the encryption operation may include encrypting data using at least one second encryption key, wherein the second encryption key(s) are different than the first encryption key(s). In some implementations, the encryption operation provided by the operation specifier 116 is configured to generate data in an encrypted format that is understandable by an external device that is outside of the service-provider network 102. As used herein, the term "decryption operation," and its equivalents, may refer to a process of decrypting data (e.g., using one or more decryption keys). As used herein, the term "storage operation," and its equivalents, may refer to a process of persisting data in memory. In various examples in which the operation specifier 116 indicates multiple operations to the incubator system 114, the operation specifier 116 may further indicate a particular order that the multiple operations are to be performed by the incubator system 114.

The incubator system 114 performs the specified operation(s) on the encrypted sensitive data. If applicable, the incubator system performs the operations in the particular order indicated by the operation specifier 116. In some cases, the incubator system 114 converts the sensitive data to plaintext and performs at least one operation on the plaintext version of the sensitive data. For example, the incubator system 114 uses at least one decryption key to convert the sensitive data from the encoded format (e.g., ciphertext), as received from the client system 104, into an unencoded format (e.g., plaintext). However, because the incubator system 114 is isolated from the client system 104, the plaintext version of the sensitive data is not visible to, and/or is otherwise inaccessible to, the client system 104.

In some cases, when at least one of the operation(s) is performed by the incubator system 114, the incubator system 114 stores a version of the sensitive data in a secure datastore 118. For example, the operation specifier 116 may provide an indication of a storage operation to the incubator system 114. The version of the sensitive data stored in the secure datastore 116 is an encrypted version of the sensitive data. For example, the sensitive data is encrypted according to the first encryption scheme, the second encryption scheme, a combination of the first and second encryption schemes, or some other encryption scheme.

The secure datastore 118 may be configured to temporarily store the sensitive data. In some cases, the incubator system 114 causes the secure datastore 118 to delete or overwrite the stored copy of the (encrypted) sensitive data in response to an event and/or in response to determining that the sensitive data has been stored for a maximum time period. For example, the incubator system 114 may overwrite the stored sensitive data with one or more null values.

According to some implementations, the incubator system 114 causes the secure datastore 118 to store the sensitive data for a minimum time period. The maximum time period and/or the minimum time period can be set by the operation specifier 116. For example, the maximum time period is a number of days (e.g., 1 day, 2 days, 3 days, 4 days, 5 days, or some other number of days) and the minimum time period is a number of minutes (e.g., 1 minute, 10 minutes, 30 minutes, 1 hour, or some other number of minutes). In some cases, the maximum time period and/or the minimum time period are indicated by the operation specifier 116 to the incubator system 114.

In various examples, once the incubator system 114 has performed the operation(s) on the sensitive data, the sensitive data becomes processed data. The incubator system 114 provides the processed data to a data provider 120 in the client system 104. Specifically, the incubator system 114 provides the processed data in an encrypted format (e.g., in ciphertext). Thus, even after the sensitive data has been processed by the incubator system 114, the client system 104 is unable to receive or access the sensitive data in a plaintext format.

The data provider 120 forwards the processed data to an external system 122. The external system 122 is outside of the service-provider network 102. In various examples, the secure gateway 112 receives the processed data from the data provider 120, at least partially decrypts the data, and transmits the at least partially decrypted data to the external system 122. In some cases, the data provider 120 transmits the encrypted processed data to the external system 122. The external system 122 therefore receives the processed data without the client system 104 having access to the sensitive data provided by the user in a plaintext format.

Although not illustrated in FIG. 1, in some cases, the environment 100 can include multiple client systems 104. For example, a first client system 104 may include a first operation specifier 116 that indicates a validation operation, a transformation operation, and a storage operation to the incubator system 114. A second client system 104 may include a second operation specifier 116 that indicates an encryption operation to the incubator system 114. The first client system 104 may include the network-side application 110 and the second client system 104 may include the data provider 120. In various implementations, the incubator system 114 may indicate, to the first client system 104, a location at which the sensitive data is stored in the secure datastore 118 in accordance with the storage operation. The first client system 104 may communicate the location to the second client system 104, such that the second client system 104 may request one or more copies of the sensitive data (which is encrypted and processed) by indicating the location to the incubator system 114. In some cases, the second client system 104 indicates the location of the processed sensitive data to the incubator system 114 in an operation specifier 116. In some examples, the secure gateway 112 provides the encrypted sensitive data directly to the incubator system 114 without the encrypted sensitive data passing through the client system 104.

A particular example will now be described with reference to FIG. 1. In this example, the service-provider network 102 is associated with a hospital. The user is a care provider entering confidential medical information, about a patient, into the form 106. For instance, the care provider enters a name of a patient and a blood pressure value of the patient into the form 106 and submits the form 106. The form 106, for example, is output within a web browser operating on the user device 106. The user device 106 is, for example, a tablet computer associated with the care provider.

As data representing the name and blood pressure value of the patient enters the service-provider network 102, the secure gateway 112 encrypts the data. The secure gateway 112 forwards the encrypted data to the network-side application 110 of the client system 104. Because the data representing the name and blood pressure value is encrypted when it is received by the client system 104, the client system 104 is unable to access the name and blood pressure value in plaintext. The network-side application 110 of the client system 104 forwards the encrypted data to the incubator system 114 for further processing.

In this example, the operation specifier 116 indicates a few operations to the incubator system 114. The operation specifier 116 indicates a validation operation, which may be a check that the blood pressure value is within a physiological limit. This may prevent an erroneously input blood pressure value from being stored in the electronic medical record (EMR) of the patient. The operation specifier 116 may indicate a transformation operation, which may be a process of converting the data from a first format to a second format that is appropriate for storage in the EMR, such as a particular packet format. The operation specifier 116, in this example, also indicates an encryption operation, which may be an encryption according to a second encryption scheme. For instance, the operation specifier 116 indicates a particular encryption key to the incubator system 114. The operation specifier 116 may further indicate a storage operation, which may be to store the resultant data for a maximum period of one day. In various cases, the operation specifier 116 may further specify an order of the operations. For example, the operation specifier 116 may indicate that the incubator system 114 is to first perform the validation operation, then the transformation operation, then the encryption operation, and then the storage operation.

The incubator system 114 performs the operations on the encrypted data in accordance with the specified order of the operations. During the course of these operations, the incubator system 114 may decrypt the encrypted data and perform at least some of the operations on the plaintext version of the confidential patient data. For example, the incubator system 114 decrypts the encrypted data, resulting in a text string indicating the name and blood pressure of the patient in plaintext. The incubator system 114 may confirm, based on the string, that the blood pressure value is within a physiologically possible range. If the incubator system 114, however, determines that the blood pressure value is outside of the physiologically possible range, then the incubator system 114 may return a message to the client system 104, which may cause the user device 108 to output an error message requesting resubmission of the blood pressure value. For example, the user may have mistyped the blood pressure value into the form 106 and can have the opportunity to resubmit the form 106 with the accurate blood pressure value.

Once the incubator system 114 performs the validation operation and confirms that the blood pressure is in the physiologically possible range, the incubator system 114 can perform the other operations. The incubator system 114 performs the transformation operation by converting the string into the format suitable for the EMR. For example, the EMR format may include the letter "N" before the name and the letters "BP" before the blood pressure value in the string, and the incubator system 114 may insert the letters into the string accordingly. The incubator system 114 may perform the encryption operation by encrypting the string in the EMR format using the encryption key. For ease of explanation, the encrypted string in the EMR format will be referred to as "processed data." Further, the incubator system 114 may perform the storage operation by storing the processed data in an entry of the secure datastore 118. Because the processed data is encrypted, the secure datastore 118 refrains from storing the confidential patient data in any format in plaintext.

In this example, the external system 122 may be a server associated with an external EMR system. The data provider 120 may forward the processed data from the incubator system 114 to the external system 122. The data provider 120 and/or the client system 104 may refrain from storing the processed data. In some cases, the transfer of the processed data from the data provider to the external system 122 may be interrupted. For example, the external system 122 may be offline for routine maintenance. In these cases, the data provider 120 may retry the transmission by requesting another copy of the processed data from the incubator system 114 and transmitting the copy of the processed data to the external system 122. The incubator system 114 may retrieve the requested copy from the secure datastore 118. The data provider 120 may request copies and retransmit the copies until the external system 122 acknowledges receipt of at least one copy of the processed data or the processed data is overwritten in the secure datastore 118.

One day after storing the processed data in the secure datastore 118, the incubator system 114 may overwrite the stored processed data in the entry with a null value. In some cases, the incubator system 114 may cause the processed data to be overwritten earlier than one day after storage if the external system 122 acknowledges receipt of the processed data. By only temporarily storing the processed data, the chance of a malicious actor accessing the confidential patient data in the secure datastore 118 is further reduced, and potentially eliminated.

Accordingly, in this example, the external system 122 receives the processed data, which is a version of the confidential patient data that is validated and in an appropriate format for further processing by the external system. Further, in this example, the client system 104 only receives versions of the confidential patient data that are encrypted, and is unaware of decryption key(s) configured to decrypt the data, such that the client system 104 is unable to access the confidential patient data in plaintext.

The incubator system 114 can be used to protect other types of sensitive data from the client system 104. For example, the form 106 may be a credit card application that receives confidential information from the user, the incubator system 114 may process the data in the credit card application on behalf of the client system 104, and the external system 122 may be a banking partner that can receive the processed credit card application. In some cases, the form 106 may be an insurance application that receives confidential information from the user, the incubator system 114 may process the data in the insurance application on behalf of the client system 104, and the external system 122 may be associated with an insurance provider that can received the processed insurance application. In various implementations, the incubator system 114 may protect and process other forms of sensitive data from the client system 104.

Figure 2A:
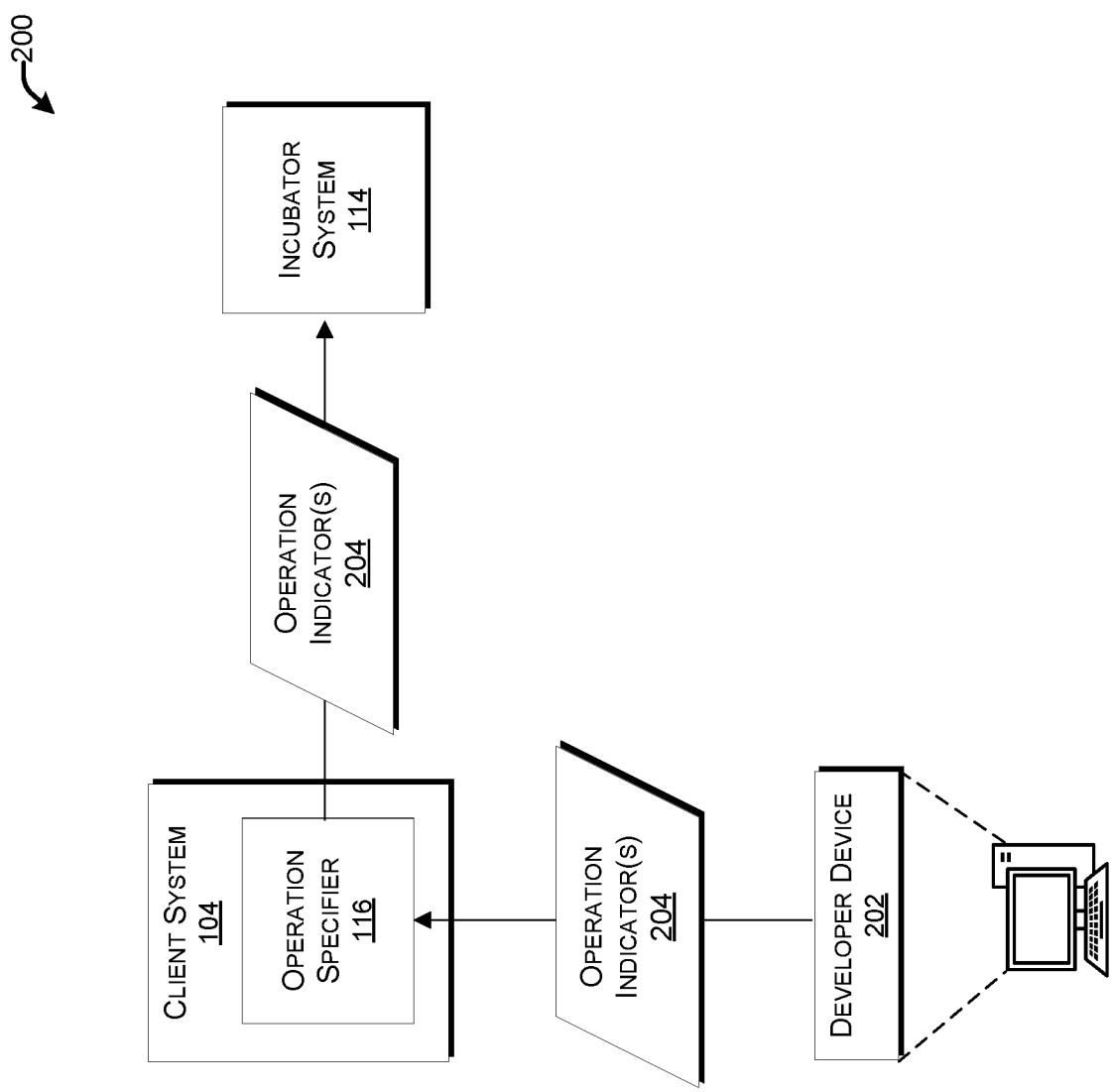
FIG. 2A illustrates example signaling for specifying operations to be performed on sensitive data in a secure environment.

FIG. 2A illustrates example signaling 200 for specifying operations to be performed on sensitive data in a secure environment. As illustrated, the signaling 200 is between the client system 104, the incubator system 114, and the operation specifier 116 described above with reference to FIG. 1. In the example of FIG. 2A, a developer device 202 is also illustrated.

The developer device 202 includes at least one computing device associated with one or more developers associated with the client system 104. In various examples, the client system 104, the incubator system 114, and the operation specifier 116 are hosted by a service-provider network (e.g., the service-provider network 102 described above with reference to FIG. 1). In some cases, the developer device 202 is outside of the service-provider network. For example, the developer device 202 can be operated by developers writing software or other instructions to be performed by the client system 104. The developer device 202 transmits the software or other instructions to the service-provider network, which stores and/or executes the software or other instructions using hardware resources (e.g., memory, processors, etc.) in the service-provider network. For example, the developer device 202 transmits an indication of a form (e.g., the form 106 described above with reference to FIG. 1) to be output by the client system 104 on a user device, through which a user submits sensitive data.

As shown, the developer device 202 transmits one or more operation indicators 204 to the operation specifier 116 in the client system 104. The operation indicator(s) 204 include one or more data packets specifying at least one operation to be performed on sensitive data (e.g., in the service-provider network 102) prior to transmission to an external system (e.g., the external system 122, which is outside of the service-provider network 102). The operation specifier 116 may forward the operation indicator(s) 204 to the incubator system 114. In some cases, the operation indicator(s) 204 transmitted by the operation specifier 116 to the incubator system 114 are in a different format than the operation indicator(s) 204 transmitted by the developer device 202.

The operation(s) specified in the operation indicator(s) 204 include at least one of a validation operation, a transformation operation, an encryption operation, a decryption operation, or a storage operation. The incubator system 114 performs the operation(s) on sensitive data received from the client system 104. For example, the incubator system 114 validates, transforms, encrypts, decrypts, stores, or performs any combination of the operation(s), on the sensitive data. The sensitive data received from the client system 104 may be encrypted. While performing the operation(s), the incubator system 114 may at least temporarily decrypt the sensitive data and process the sensitive data in a plaintext format. However, the sensitive data processed by the incubator system 114 is inaccessible to the client system 104 when in the plaintext format. If the incubator system 114 causes storage of the sensitive data, the sensitive data is stored in an encrypted format.

In some cases, in which multiple operations are specified in the operation indicator(s) 204, the operation indicator(s) 204 further specify an order of the operations to be performed by the incubator system 114. The incubator system 114, for example, performs the multiple operations on the sensitive data in the order specified by the operation indicator(s) 204.

Figure 2B:
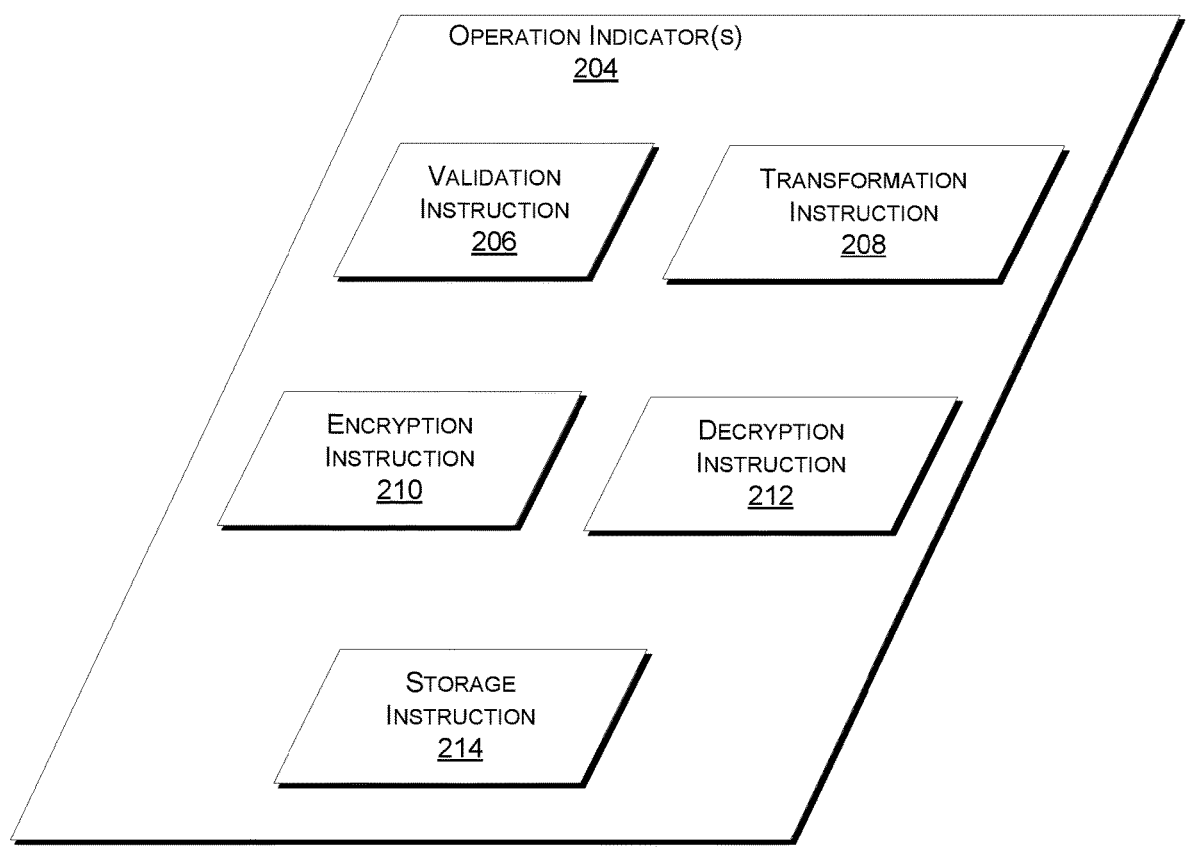
FIG. 2B illustrates an example of an operation specified by a client system to an incubator system.

FIG. 2B illustrates an example of the operation indicator(s) 204 described with respect to FIG. 2A. The operation indicator(s) 204 include various operation instructions 206 to 214. For example, the operation indicator(s) 204 include a validation instruction 206, a transformation instruction 208, an encryption instruction 210, a decryption instruction 212, and a storage instruction 214. In some cases, any one or more of the operation instructions 206 to 214 may be omitted from the operation indicator(s) 204.

According to various implementations, the operation instructions 206 to 214 include instructions that, when executed by the incubator system 114, cause the incubator system 114 to perform various operations on data. For example, the validation instruction 206 may cause the incubator system 114 to confirm that data is in a particular format; the transformation instruction 208 may cause the incubator system 114 to convert the data from one format to another format; the encryption instruction 210 may cause the incubator system 114 to encrypt the data using a particular encryption scheme (e.g., using an encryption key); the decryption instruction 212 may cause the incubator system 114 to decrypt the data using a particular decryption scheme (e.g., using a decryption key); and the storage instruction 214 may cause the incubator system 114 to store the data (e.g., in an encrypted format). The operation instructions 206 to 214 may include computer code that is executed by the incubator system 114. In particular examples, the operation instructions 206 to 214 may be included in a payload of the operation indicator(s) 204.

The following first example code illustrates instructions for performing validation on encrypted data:

```
[
  {
    "validate": {
      "data": {
        "decrypt": {
          "data": {
            "literal": {
              "@type": "EncryptedFields",
              "value": {
                "firstName": "[[X]]"
              }
            }
          }
        },
        "credential": {
          "key": "[[key]]"
        }
      }
      "constraints": [
        {
          "type": "PatternConstraint",
          "clientReferenceName": "nameMatchesRegex",
          "applicableField": "firstName",
          "pattern": "[A-Za-z]+"
        }
      ]
    }
  }
]
```

Although the first example code is written in a Javascript Object Notation (JSON) format, implementations are not so limited. For example, the first example code may instead be provided to the incubator system 114 in an Extensible Markup Language (XML), or any other suitable programming language that can specify operations to be executed by the incubator system 114.

The first example code specifies a "validate" operation. Upon executing this operation, the incubator system 114 may be configured to return a result of the operation to the client system 104. Line 4 of the first example code specifies the data for the operation. Line 5 of the first example code specifies the "decrypt" operation that causes the incubator system 114 to decrypt encrypted sensitive data (e.g., received from the client system 104). The data to be decrypted is specified as a literal value in line 10. Line 14 specifies the decryption key (e.g., a private key) which can be used to decrypt the encrypted sensitive data. The incubator system 114 may be configured to convert the encrypted sensitive data into plaintext data.

Line 19 indicates the validation constraint to be applied to the plaintext data. In this case, the constraint is whether a "firstName" field includes only lowercase or uppercase English letters. For example, if the plaintext data included a firstName field with a number, the incubator system 114 would indicate, to the client system 104, that the validation operation was unsuccessful. In various examples, the incubator system 114 may be configured to execute the operations indicated in the first example code in the order specified. For example, the incubator system 114 may begin performing the validation operation by decrypting the encrypted sensitive data, performing the decrypt step, and then generating the result of the validation operation. The result of the validation operation may be returned to the client system 104.

The following second example code illustrates an example of instructions for performing operations, which may be specified in the operation indicator(s) 204 described with respect to FIG. 2A:

```
{
  "encrypt": {
    "data": {
      "replace": {
        "data": {
          "unseal": {
            "data": {
              "storedData": {
                "dataID": "[[locationA]]"
              }
            }
          }
        },
        "replaceDetailslist": [
          {
            "applicableField": "firstName",
            "resultingFieldName": "name",
          }
        ]
      }
    },
    "encryptionDetails": {
      "type": "[[EncryptionTypeB]]",
      "EncryptionScheme": "[[SchemeC]]",
      "Key": "[[KeyD]]"
    }
  }
}
```

Although the second example code is written in a JSON format, implementations are not so limited. For example, the instructions indicated in the second example code may instead be provided to the incubator system 114 in an XML format, or any other suitable programming language that can specify operations to be executed by the incubator system 114.

Line 2 of the second example code specifies the final operation "encrypt," which causes the incubator system 114 to return processed, encrypted data to the client system 104. Line 3 specifies the processed data to be encrypted. Line 4 specifies a replace operation, which causes the incubator system 114 to convert data into processed data. In the second example code, the replace operation causes the incubator system 114 to convert the data from a first format (e.g., a format that includes the "firstName" key) to a second format (e.g., a format that includes "name"). Line 5 specifies the data for the replace operation. In the second example code, the data to be transformed comes from an "unseal" operation, which causes the incubator system 114 to decrypt the data stored at the location specified in line 9 (e.g., "[[locationA]]"). Upon executing the second example code, the incubator system 114 may retrieve the data at the specified location, decrypt the data using the unseal operation, transform the data using the replace operation, and encrypt the transformed data using the key specified at line 25 (e.g., by encrypting according to "[[EncryptionTypeB]]" with "[[keyD]]" using scheme "[[SchemeC]]").

Figure 3:
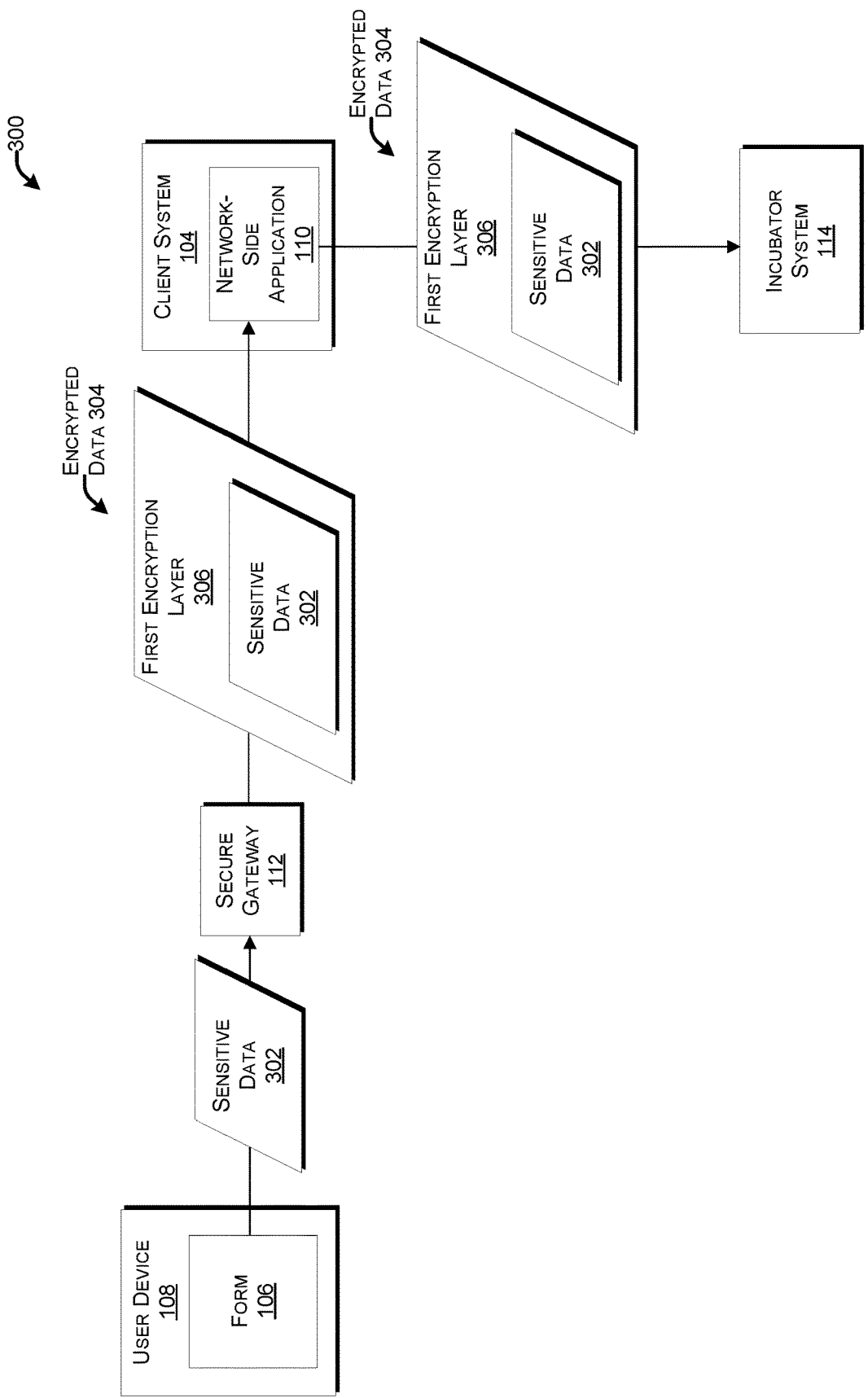
FIG. 3 illustrates example signaling for receiving sensitive data in a service-provider network.

FIG. 3 illustrates example signaling 300 for receiving sensitive data 302 in a service-provider network. As shown, the signaling 300 is between the client system 104, the form 106, the user device 108, the network-side application 110, the secure gateway 112, and the incubator system 114 described above with reference to FIG. 1.

In various implementations, a user of the user device 108 inputs the sensitive data 302 into the form 106, which is provided by the user device 108. The sensitive data 302 includes data that is not publicly available. In some examples, the sensitive data 302 includes personally identifying information, such as data indicating a name, address, contact information (e.g., phone number, e-mail address, etc.), citizenship, employer, or SSN. In some cases, the sensitive data 302 includes confidential information associated with the user, such as financial information (e.g., credit card numbers, SSN, financial account numbers, income levels, etc.), medical information (e.g., lab results, medications, medical history, genetic information, etc.), and other user-identifying information. In some cases, the sensitive data 302 includes confidential information associated with another entity, such as a friend, family member, patient, government, client, or employer of the user. For example, the sensitive data 302 may include data indicating a trade secret of an employer of the user, data associated with a governmental security clearance level, or the like.

The user device 108 transmits the sensitive data 302 to a service-provider network (e.g., the service-provider network 102 described above with reference to FIG. 1), which includes the secure gateway 112. The secure gateway 112 is configured to encrypt or otherwise protect the sensitive data 302 in the service-provider network. For example, the secure gateway 112 generates encrypted data 304 by encrypting the sensitive data 302 with a first encryption layer 306. For example, the secure gateway 112 encrypts the sensitive data 302 using at least one encryption key. The secure gateway 112 provides the encrypted data 304 to the network-side application 110 of the client system 104.

In various implementations, the client system 104 is unable to access the sensitive data 302 in plaintext. For example, the encrypted data 304 may be decrypted using one or more decryption keys, but the client system 104 is unable to identify or access the decryption key(s).

The network-side application 110 of the client system 104 may forward the encrypted data 304 to the incubator system 114. The incubator system 114 may perform at least one operation on the encrypted data 304. The operation(s), for example, are pre-specified by the client system 104. For example, the incubator system 114 may perform a validation operation, a transformation operation, an encryption operation, a decryption operation, a storage operation, or any combination thereof.

In various implementations, the incubator system 114 may decrypt the encrypted data 304. For example, the incubator system 114 may have access (e.g., store) the decryption key(s) configured to remove the first encryption layer 306. Accordingly, the incubator system 114 may perform one or more of the operation(s) on the sensitive data 302 in plaintext. However, because the client system 104 is isolated from the incubator system 114, the client system 104 may be unable to access the sensitive data 302 in plaintext.

Figure 4:
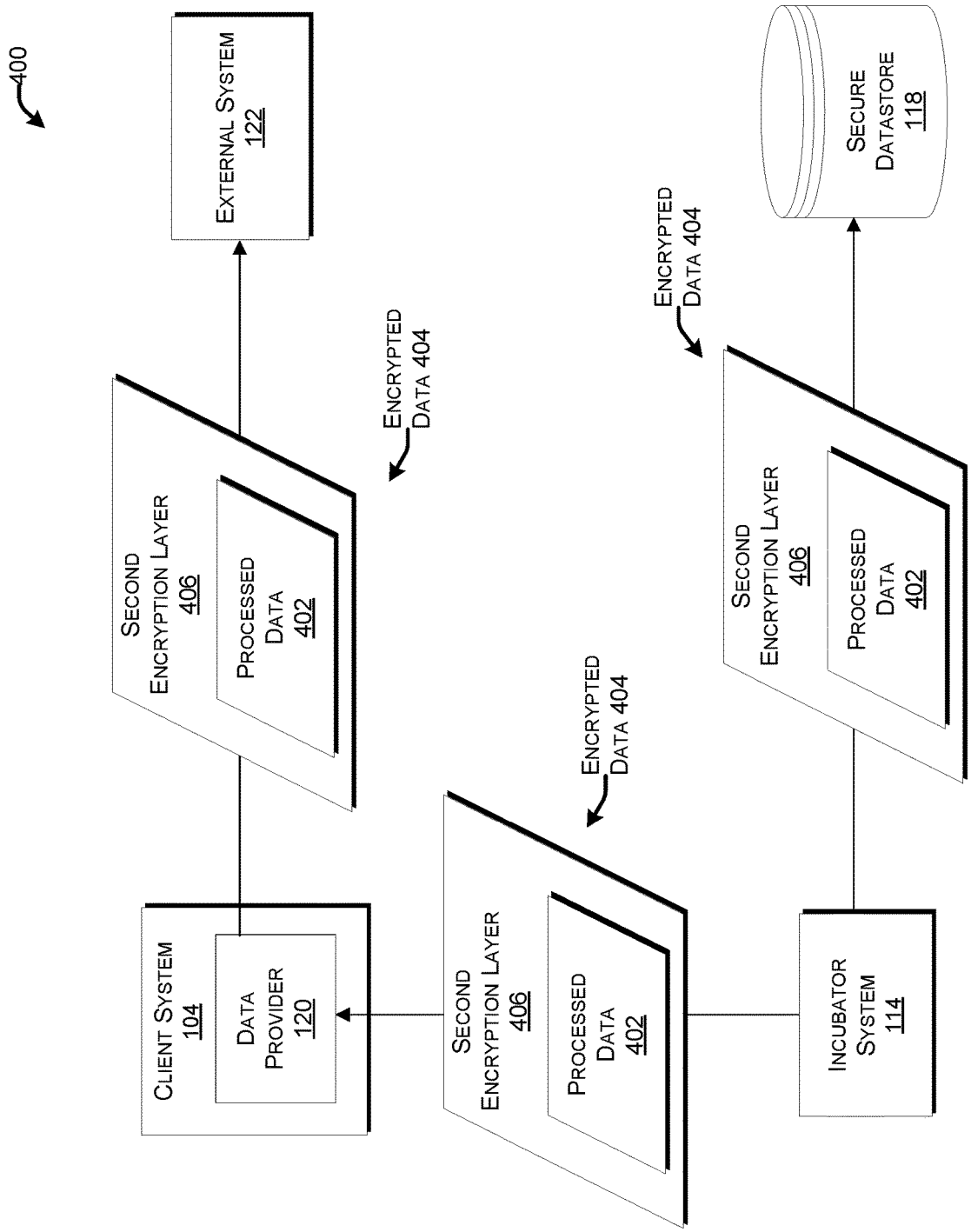
FIG. 4 illustrates example signaling for processing, storing, and providing sensitive data to an external system.

FIG. 4 illustrates example signaling 400 for processing, storing, and providing sensitive data to the external system 122. As shown, the signaling 400 is between the client system 104, the incubator system 114, the secure datastore, the data provider 120, and the external system 122 described above with reference to FIG. 1.

In various examples, the incubator system 114 generates processed data 402 by performing at least one operation on sensitive data (e.g., the sensitive data 302 described above with reference to FIG. 3). For example, the incubator system 114 generates the processed data 402 by validating the sensitive data 302, transforming the sensitive data 302, or a combination thereof.

According to various implementations, the incubator system 114 generates encrypted data 404 by encrypting the processed data 402 in a second encryption layer 406. In some cases, the incubator system 114 uses the same encryption scheme that the secure gateway 112 used to generate the encrypted data 304. For example, the incubator system 114 may use the same encryption key(s) used by the secure gateway 112 to encrypt the processed data 402. In some examples, the incubator system 114 uses a different encryption scheme than the one used by the secure gateway 112 to generate the encrypted data 304. For example, the incubator system 114 may use different encryption key(s) than those used by the secure gateway 112.

In some implementations, the encryption scheme used by the incubator system 114 to generate the encrypted data 404 is specified by the client system 104. According to some cases, the encryption key(s) and/or the encryption scheme used by the incubator system 114 is specified in the operation indicator(s) 204 pre-supplied by the client system 104. For example, the encryption key(s) and/or the encryption scheme are associated with the external system 122, such that the external system 122 is configured to process (e.g., decrypt) data encrypted with the encryption key(s) used by the incubator system 114.

In some cases, the incubator system 114 stores the encrypted data 404 in the secure datastore 118. Because the encrypted data 404 is stored in an encrypted format, the processed data 402 is protected from being exposed via inadvertent data leakage. In various examples, the secure datastore 118 stores the encrypted data 404 for at least a minimum time period and/or no longer than a maximum time period. In some cases, the minimum time period and/or the maximum time period are specified in the operation indicator(s) 204. If the encrypted data 404 has been stored for the maximum time period, the incubator system 114 overwrites the copy of the encrypted data 404 stored in the secure datastore 118 (e.g., with one or more null values) or otherwise deletes the encrypted data 404 from the secure datastore 118. By limiting the amount of time that the encrypted data 404 is persisted in the service-provider network, potential data leakage of the processed data 402 outside of the service-provider network can be minimized.

The incubator system 114 also provides the encrypted data 404 to the data provider 120 of the client system 104. The data provider 120, in turn, may at least attempt to forward the encrypted data 404 to the external system 122. In various cases, the client system 104 lacks one or more decryption keys configured to remove the second encryption layer 406 from the encrypted data 404. Accordingly, the processed data 402 is protected from access by the client system 104. The client system 104 is unable to access the processed data 402 in plaintext.

Although not illustrated in FIG. 4, in some cases, the data provider 120 transmits the encrypted data 404 to the secure gateway 112. In some examples, the processed data 402 and/or the second encryption layer 406 include the first encryption layer 306. The secure gateway 112 may remove the first encryption layer 306 by at least partially decrypting the encrypted data 404 using the decryption key(s) associated with the first encryption layer 306. In some cases where the secure gateway 112 removes the first encryption layer 306 from the encrypted data 404 before transmitting the encrypted data 404 to the external system 122, the external system 122 receives the processed data 402 in an encrypted format, such that the external system 122 may not receive the processed data 402 in plaintext.

Upon receiving the encrypted data 404, the external system 122 may be configured to remove the second encryption layer 406 by decrypting the encrypted data 404 using one or more decryption keys. The external system 122 may therefore access the processed data 402 in plaintext.

Figure 5:
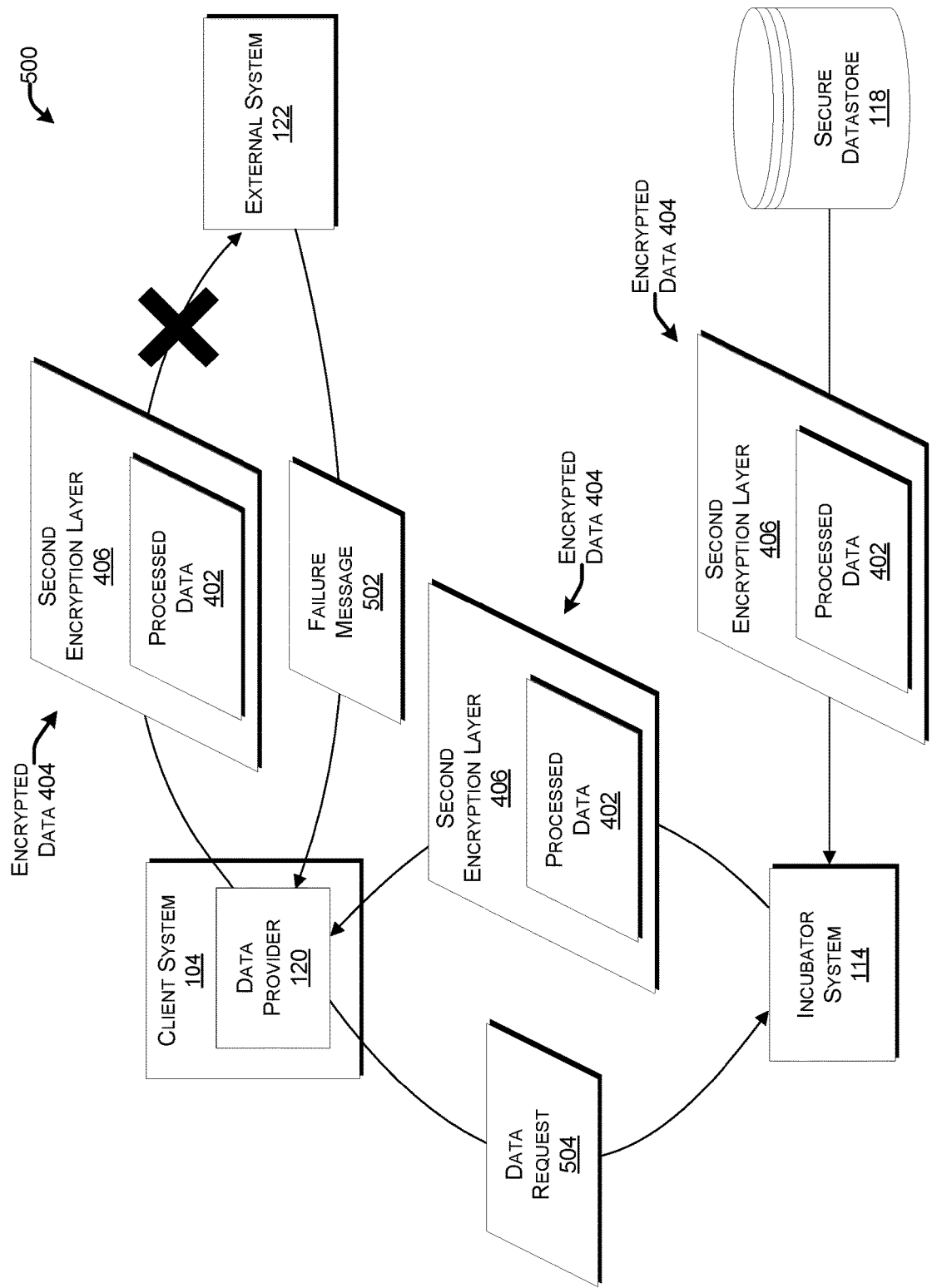
FIG. 5 illustrates example signaling for retransmitting encrypted data to the external system.

FIG. 5 illustrates example signaling 500 for retransmitting the encrypted data 404 to the external system 122. As shown, the signaling 500 is between the client system 104, the incubator system 114, the secure datastore 118, the data provider 120, and the external system 122 described above with reference to FIG. 1.

As shown in FIG. 5, the data provider 120 of the client system 104 attempts to transmit the encrypted data 404 to the external system 122. However, the external system 122 is unable to receive the encrypted data 404. For example, the external system 122 transmits a failure message 502 to the data provider of the client system 104, which may indicate that the external system 122 did not receive the encrypted data 404. In alternate examples, the external system 122 is configured to transmit an acknowledgement message (also referred to as a "confirmation message") to the client system 104 when the encrypted data 404 is successfully received by the external system 122. If the client system 104 determines that the acknowledgement message has not been received within a threshold time period (e.g., 1 second, 10 seconds, 1 minute, or 5 minutes) of transmitting the encrypted data 404 to the external system 122, the client system 104 may determine that the encrypted data 404 was unsuccessfully received by the external system 122.

Based on determining that the encrypted data 404 was unsuccessfully received by the external system 122, the data provider 120 may transmit a data request 502 to the incubator system 114. The data request 502 may be a request for another copy of the encrypted data 404.

Based on receiving the data request 504 from the data provider 120 of the client system 104, the incubator system 114 may retrieve a copy of the encrypted data 404 stored in the secure datastore 118. The incubator system 114 may transmit the copy of the encrypted data 404 to the data provider 120 of the client system 104. In various implementations, the client system 104 may at least attempt to transmit the copy of the encrypted data 404 to the external system 122. In examples in which the encrypted data 404 is unsuccessfully received by the external system 122, the cycle illustrated in FIG. 5 can be repeated. That is, the client system 104 may once again send the data request 504 to the incubator system 114, the incubator system 114 may retrieve and forward the encrypted data 404, the data provider 120 may attempt to retransmit the encrypted data 404 to the external system 122, and so on.

In various examples, the retransmitted encrypted data 404 is successfully received by the external system 122. For example, the external system 122 transmits an acknowledgement message to the data provider 120 of the client system 104. In some cases, the data provider 120 may, in turn, transmit a deletion request to the incubator system 114. Based on the deletion request, the incubator system 114 may cause the secure datastore 118 to refrain from continuing to store the encrypted data 404. For example, the incubator system 114 may overwrite the stored encrypted data 404 in the secure datastore 118 with one or more null values.

Figure 6:
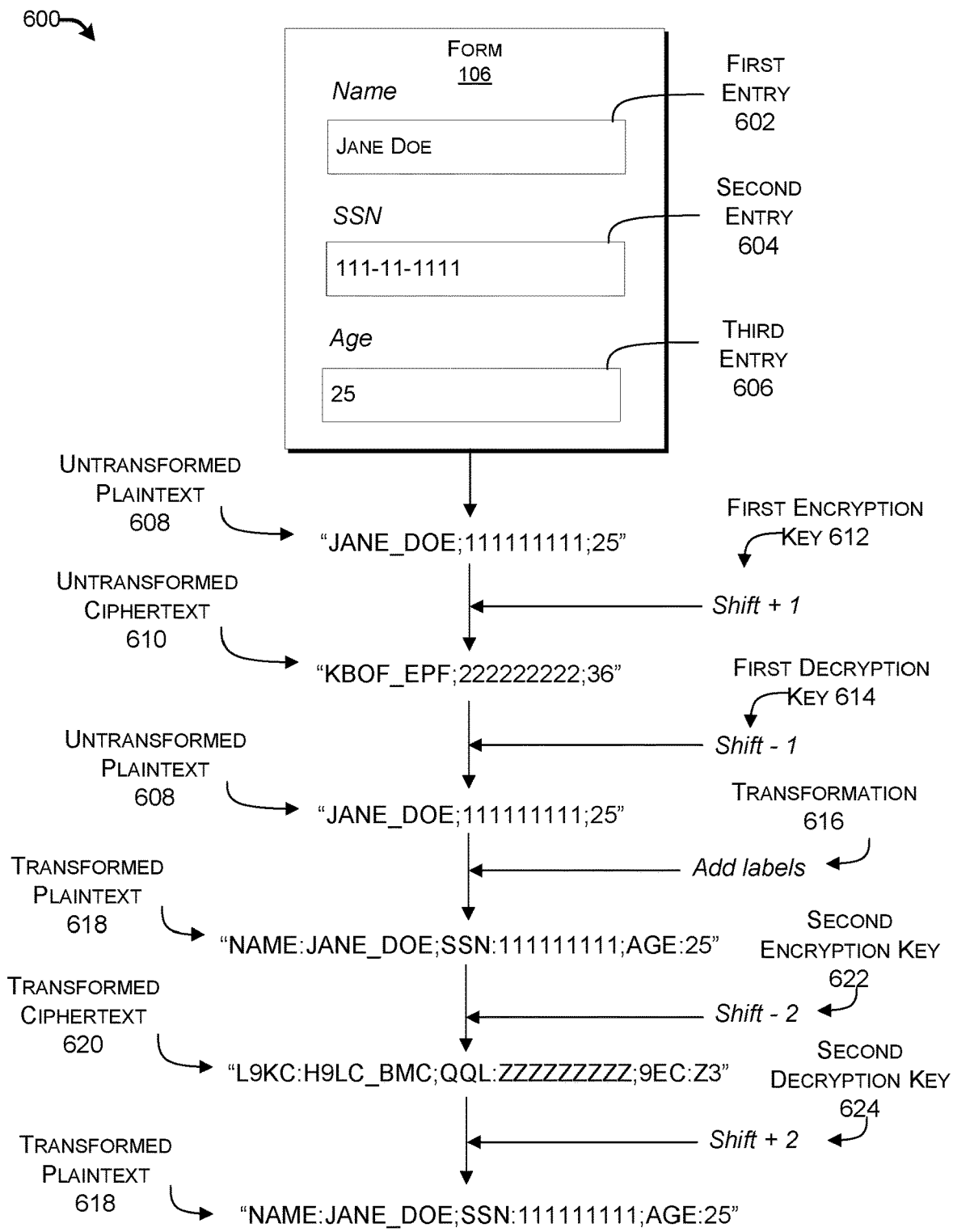
FIG. 6 is a diagram illustrating an example flow of data through a data incubator system.

FIG. 6 is a diagram illustrating an example flow of data through the data incubator system. In various examples, a user inputs sensitive data into the form 106. In the example illustrated in FIG. 6, the form 106 receives a first entry 602, a second entry 604, and a third entry 606 from the user. The first entry 602 represents a name of the user ("Jane Doe"), the second entry represents an SSN of the user ("111-11-1111"), and the third entry represents an age of the user ("25"). For example, the form 106 is an application for an insurance product.

The user device providing the form 106 converts the first entry 602, the second entry 604, and the third entry 606 into a single string of untransformed plaintext 608. For example, the user device concatenates the first entry 606 with a first semicolon, the second entry 604, a second semicolon, and the third entry 606. The user device transmits the untransformed plaintext 608 to a service-provider network.

In various examples, a secure gateway within the service-provider network receives the untransformed plaintext 608 from the user device. The secure gateway generates untransformed ciphertext 610 by encrypting the untransformed plaintext 608 based on a first encryption key 612. In the example of FIG. 6, the first encryption key 612 specifies a Caesar cipher corresponding to a shift of each letter and number up by one in the alphabet (and assuming numbers follow letters). However, implementations are not limited to Caesar ciphers.

The secure gateway provides the untransformed ciphertext 610 to the client system. The client system forwards the untransformed ciphertext 610 to the incubator system. In various examples, the incubator system includes, stores, or otherwise has access to a first decryption key 614. The incubator system generates the untransformed plaintext 608 based on the first decryption key 614. For example, the first decryption key 614 specifies a Caesar cipher corresponding to a shift of each letter and number down by one.

According to various implementations, the incubator system can perform various operations on the untransformed plaintext 608. For instance, the incubator system performs a transformation 616 on the untransformed plaintext 608. In the example of FIG. 6, the transformation 616 inserts labels (e.g., "NAME:," "SSN:," and "AGE:") into the untransformed plaintext 608. In some cases, the transformation 616 is pre-specified by the client system. Accordingly, the incubator system generates transformed plaintext 618.

The incubator system may generate transformed ciphertext 620 based on the transformed plaintext 618 and a second encryption key 622. For example, the second encryption key 622 specifies a Caesar cipher corresponding to a shift of each letter and number down by two. The second encryption key 622 is different than the first encryption key 612 in the example of FIG. 1. In various implementations, the incubator system provides the transformed ciphertext 620 to the client system, which forwards the transformed ciphertext 620 to an external system. In some examples, the external system is associated with an insurance company that will evaluate the application for insurance. The external system may have access to a second decryption key 624. The external system may use the second decryption key 624 to convert the transformed ciphertext 620 into the transformed plaintext 618. The external system may process the application for insurance based on the transformed plaintext 618.

Figure 7:
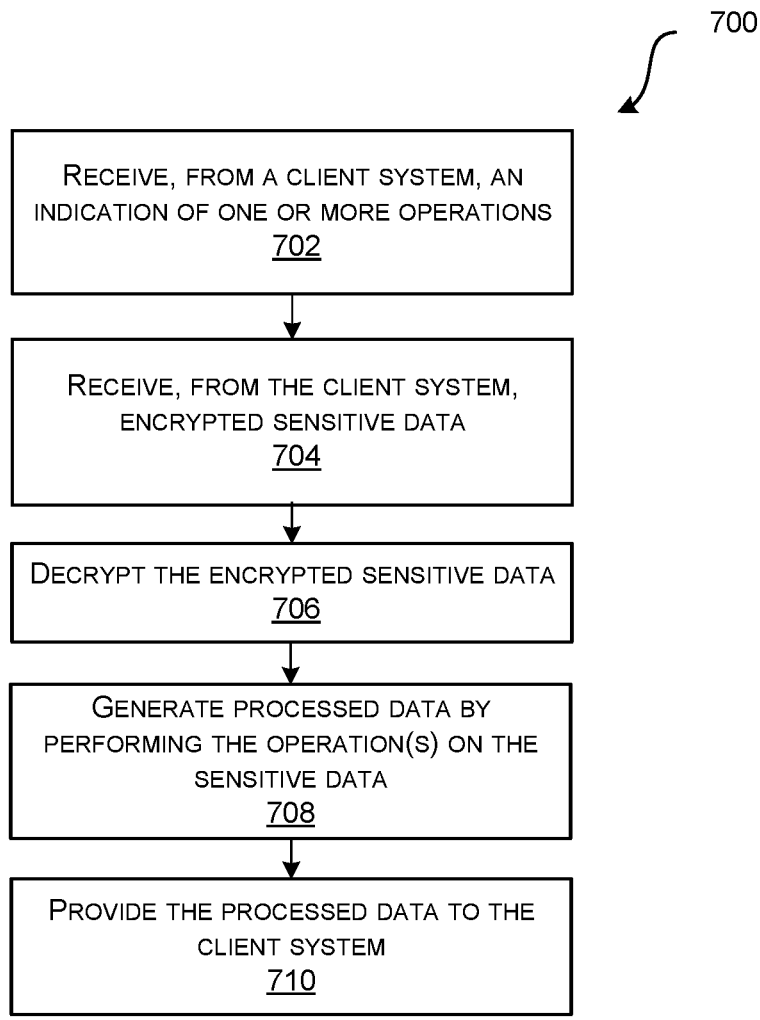
FIG. 7 illustrates an example process for handling sensitive data in an incubator system.

FIG. 7 illustrates an example process 700 for handling sensitive data in an incubator system. In various examples, the process 700 is performed by an entity including the incubator system 114 described above with reference to FIG. 1.

At 702, the entity receives, from a client system, an indication of one or more operations. The operation(s) include, for instance, at least one of a validation operation, a transformation operation, an encryption operation, a decryption operation, or a storage operation. In some cases, the entity also receives an indication, from the client system, of an order at which the operations are to be performed.

In various examples, the client system is isolated from the entity. For example, the entity is hosted by first computing resources in a service-provider network, the client system is hosted by second computing resources in the service-provider network, and the first computing resources are different than the second computing resources. In some examples, the entity is sandboxed from the client system, or vice versa.

At 704, the entity receives, from the client system, encrypted sensitive data. In various examples, the encrypted sensitive data is encrypted according to a first encryption scheme. For instance, the encrypted sensitive data has been encrypted (e.g., by a secure gateway) using one or more first encryption keys. Thus, the encrypted sensitive data is in a ciphertext format. In some cases, the sensitive data includes one or more entries of a form filled out by a user. The form is a web-based form filled out by the user in a web browser of a device associated with the user, for example. In various implementations, the sensitive data confidential information, such as user-identifying information (e.g., a name, address, an SSN, etc. of the user or another person), financial information (e.g., a credit card number, a bank account number, etc.), medical information (e.g., results of a diagnostic test, genetic information, etc.), trade secrets, or the like.

At 706, the entity decrypts the encrypted sensitive data. In various examples, the entity converts the encrypted sensitive data to a plaintext format. For example, the entity decrypts the encrypted sensitive data based on one or more second encryption keys that correspond to the first encryption key(s). Because the entity is isolated from the client system, the client system may be unable to access the sensitive data in the plaintext format.

At 708, the entity generates processed data by performing the operation(s) on the sensitive data. For example, the entity may perform the validation operation by confirming that the sensitive data is in a particular format. In some cases, the entity may perform the transformation operation by converting the sensitive data from one format to another format. In various examples, the entity may perform the encryption operation by encrypting the sensitive data in accordance with a second encryption scheme. For instance, the entity may encrypt the sensitive data using one or more second encryption keys.

In some examples, the entity may at least temporarily store the sensitive data in a secure datastore. In various implementations, the entity stores the sensitive data in an encrypted (i.e., a ciphertext) format. For example, the entity stores the sensitive data encrypted in accordance with the second encryption scheme. Thus, in some cases, the sensitive data is persisted in an encrypted format and is not persisted in a plaintext format. The entity may store the sensitive data for no less than a minimum storage time and no longer than a maximum storage time. In various examples, the minimum storage time and/or the maximum storage time are indicated by the client system at 702. In various implementations, the entity overwrites the stored sensitive data with one or more null values when the sensitive data is stored for the maximum storage time.

At 710, the entity provides the processed data to the client system. In various examples, the processed data is in an encrypted (i.e., a ciphertext) format when the processed data is provided to the client system. Thus, the client system is unable to access the sensitive data in a plaintext format. In some examples, the entity provides the processed data to the client system in response to receiving, from the client system, a request for the processed data.

Figure 8:
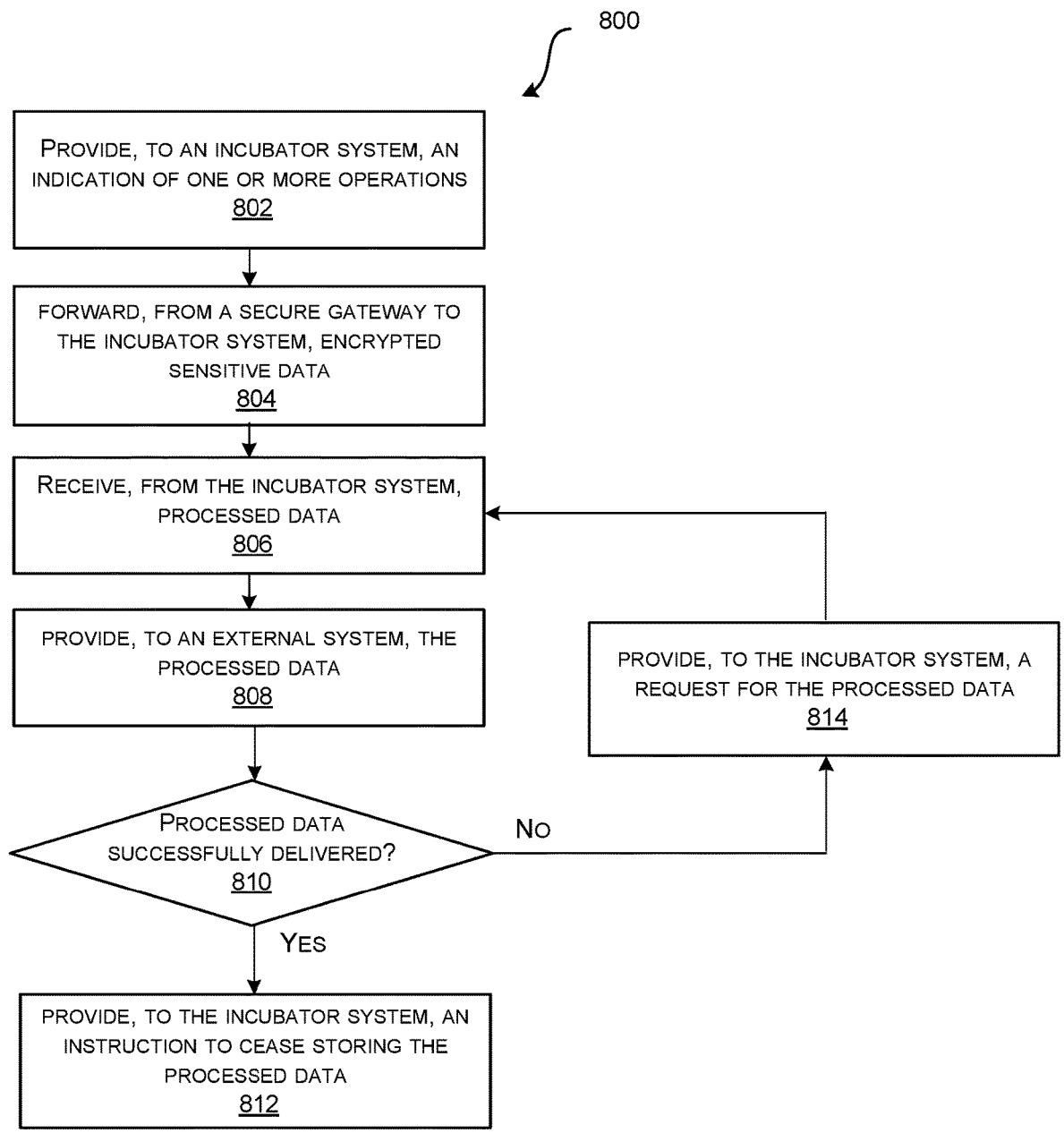
FIG. 8 illustrates an example process for handling sensitive data in an incubator system.

FIG. 8 illustrates an example process 800 for handling sensitive data in an incubator system. In various examples, the process 800 is performed by an entity including the client system 104 described above with reference to FIG. 1.

At 802, the entity provides, to an incubator system, an indication of one or more operations. The operation(s) include, for instance, at least one of a validation operation, a transformation operation, an encryption operation, a decryption operation, or a storage operation. In some cases, the entity also provides an indication, to the incubator system, of an order at which the operations are to be performed.

In various examples, the incubator system is isolated from the entity. For example, the entity is hosted by first computing resources in a service-provider network, the incubator system is hosted by second computing resources in the service-provider network, and the first computing resources are different than the second computing resources. In some examples, the entity is sandboxed from the incubator system, or vice versa. In various examples, the operation(s) and/or the order are initially specified to the entity based on a message from a developer device, which may be outside of the service-provider network.

At 804, the entity forwards, from a secure gateway to the incubator system, encrypted sensitive data. In various examples, the encrypted sensitive data is encrypted according to a first encryption scheme. For instance, the encrypted sensitive data has been encrypted (e.g., by a secure gateway) using one or more first encryption keys. Thus, the encrypted sensitive data is in a ciphertext format. In various implementations, the sensitive data confidential information, such as user-identifying information (e.g., a name, address, an SSN, etc. of the user or another person), financial information (e.g., a credit card number, a bank account number, etc.), medical information (e.g., results of a diagnostic test, genetic information, etc.), trade secrets, or the like.

In some cases, the sensitive data includes one or more entries of a form filled out by a user. The form is a web-based form filled out by the user in a web browser of a device associated with the user, for example. In various examples, the entity provides the form to the device.

At 806, the entity receives, from the incubator system, processed data. In various examples, the processed data is received in an encrypted (i.e., ciphertext) format. The incubator system may generate the processed data by performing the operation(s) on the sensitive data. In some examples, the incubator system may perform the decryption operation by decrypting encrypted sensitive data. According to some cases, the incubator system may perform the validation operation by confirming that the sensitive data is in a particular format. In some cases, the incubator system may perform the transformation operation by converting the sensitive data from one format to another format. In various examples, the incubator system may perform the encryption operation by encrypting the sensitive data in accordance with a second encryption scheme. For instance, the incubator system may encrypt the sensitive data using one or more second encryption keys.

At 808, the entity provides, to an external system, the processed data. In various cases, the external system is outside of the service-provider network. For example, the external system is associated with an external partner (e.g., a banking partner, an insurance partner, etc.) of an organization associated with the entity. In various examples, the entity forwards the processed data to the external system without decrypting the processed data.

At 810, the entity determines whether the processed data was successfully delivered to the external system. In some cases, the entity receives, from the external system, a confirmation message indicating that the external system received the processed data. In some examples, the entity receives, from the external system, an error message indicating that the external system unsuccessfully received the processed data. In various cases, the entity determines that greater than a threshold time has passed since the entity provided the processed data at 808 without the entity receiving the confirmation message, which indicates that the external system unsuccessfully received the processed data If the entity determines that the encrypted processed data was successfully delivered at 810, then the process proceeds to 812. At 812, the entity provides, to the incubator system, an instruction to cease storing the processed data. In some examples, the instruction is to delete the processed data from memory. In various cases, the instruction is to overwrite the processed data stored in the memory with one or more null values.

If, on the other hand, the entity determines that the encrypted data was unsuccessfully delivered at 810, then the process proceeds to 814. At 814, the entity provides, to the incubator system, a request for the encrypted processed data. Once the entity performs 814, the process 800 returns to 806.

Figure 9:
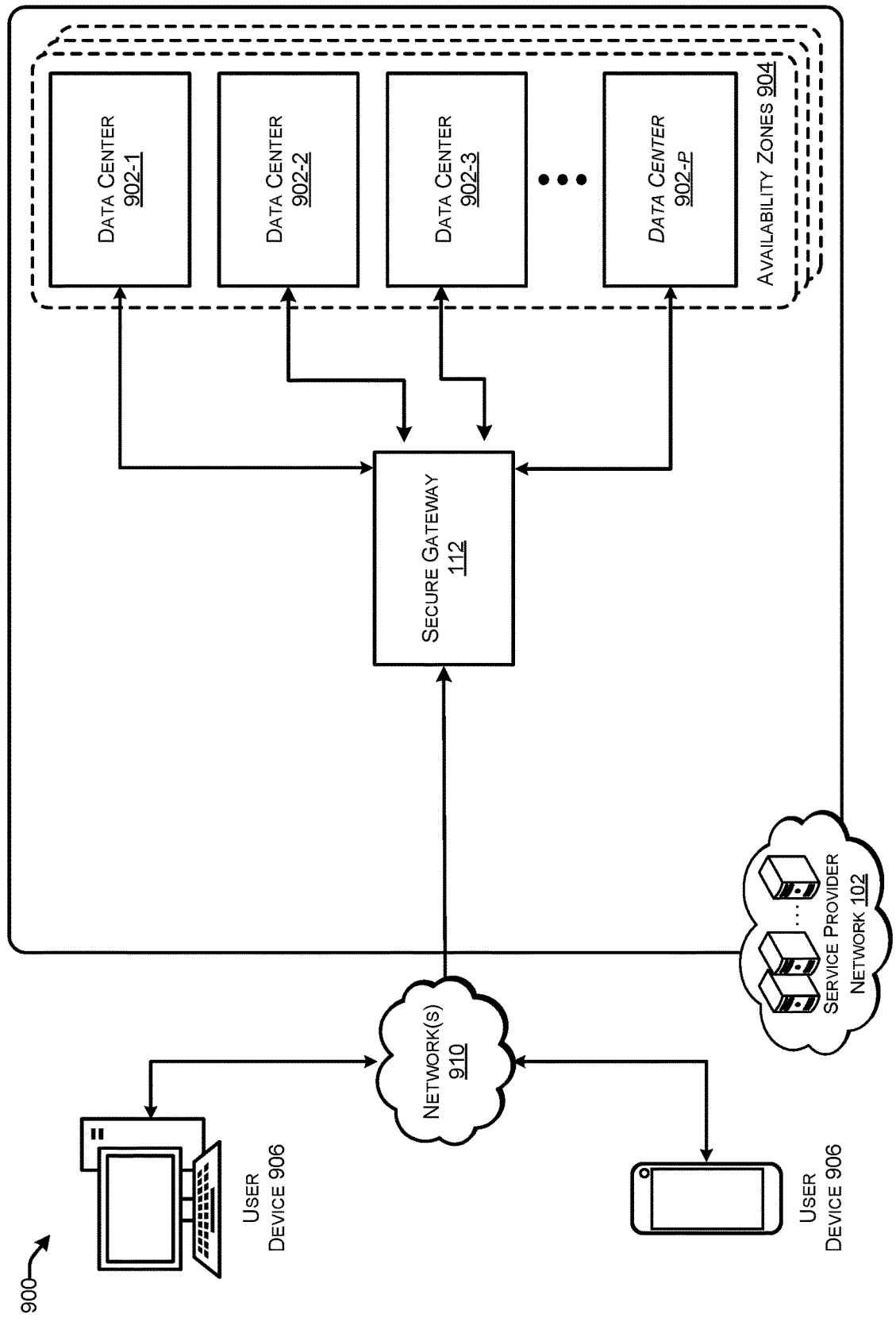
FIG. 9 is a system and network diagram showing an illustrative operating environment that includes a service-provider network, which can be configured to implement aspects of various functionalities described herein.

FIG. 9 is a system and network diagram showing an illustrative operating environment 900 that includes the service-provider network 102, which can be configured to implement aspects of various functionalities described herein. The service-provider network 102 can provide computing resources, like VM instances and storage, on a permanent or an as-needed basis.

Among other types of functionality, the computing resources provided by the service-provider network 102 may be utilized to implement various services described above. For instance, the computing resources provided by the service-provider network 102 can include various types of computing resources, such as data processing resources like VM instances, data storage resources, networking resources, data communication resources, network services, and the like. In some cases, the computing resources are provided via servers within the service-provider network 102.

Each type of computing resource provided by the service-provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, and/or other types of programs. Data storage resources can include file storage devices, block storage devices, and the like. The service-provider network 102 can also be configured to provide other types of computing resources not mentioned specifically herein.

The computing resources provided by the service-provider network 102 may be enabled in some implementations by one or more data centers 902-1 to 902-$p$, wherein p is a positive integer. The data center(s) 902-1 to 902-$p$ might be referred to herein singularly as "a data center 902" or in the plural as "the data centers 902"). The data centers 902 are facilities utilized to house and operate computer systems and associated components. The data centers 902 can include redundant and backup power, communications, cooling, and security systems. The data centers 902 can also be located in geographically disparate locations, or regions. One region may include multiple availability zones 904. A region can be defined as a geographical area in which the cloud provider network 102 clusters data centers 902. Each region can include two or more availability zones 904 connected to one another via a private high-speed network, for example a fiber communication connection. An availability zone can refer to an isolated failure domain including one or more data center facilities with separate power, separate networking, and separate cooling from those in another availability zone. In some cases, availability zones 904 within a region may be positioned far enough away from one other that the same natural disaster should not take more than one availability zone 904 offline at the same time. One illustrative embodiment for a data center 902 that can be utilized to implement the technologies disclosed herein will be described below with regard to FIG. 10.

Various user devices 906 that utilize the service-provider network 102 may access the computing resources provided by the service-provider network 102 over the external network(s) 910, which may include any wired and/or network(s). The external network(s) 910 may include a Wide Area Network (WAN), such as the Internet, an intranet or an Internet Service-provider (ISP) network or a combination of such networks. In some cases, the external network(s) 910 may include a cloud-based network. In some examples, without limitation, a user device 906 operated by a client of the service-provider network 102 may be utilized to access the service-provider network 102 by way of the external network(s) 910. It should be appreciated that a Local Area Network (LAN), the Internet, or any other networking topology known in the art that connects the data centers 902 to remote clients and other users can be utilized. It should also be appreciated that combinations of such networks can also be utilized.

In particular implementations, the user device 906 may control a virtualized resource in the service-provider network 102. In some cases, the user device 906 may provide sensitive data to a virtualized resource in the service-provider network 102. The secure gateway 112 may intercept data traffic transmitted from the user device 906 to an entity (e.g., a virtualized resource) in the service-provider network 102 and may encrypt the data traffic before forwarding the encrypted data traffic to its destination in the service-provider network 102. In some cases, although not specifically illustrated in FIG. 9, at least a portion of the secure gateway 112 can be hosted by one or more of the data centers 902. In some cases, the client system 104, the incubator system 114, the secure datastore 118, or any combination thereof, are hosted in one or more of the data centers 902-1 to 902-$p$.

Figure 10:
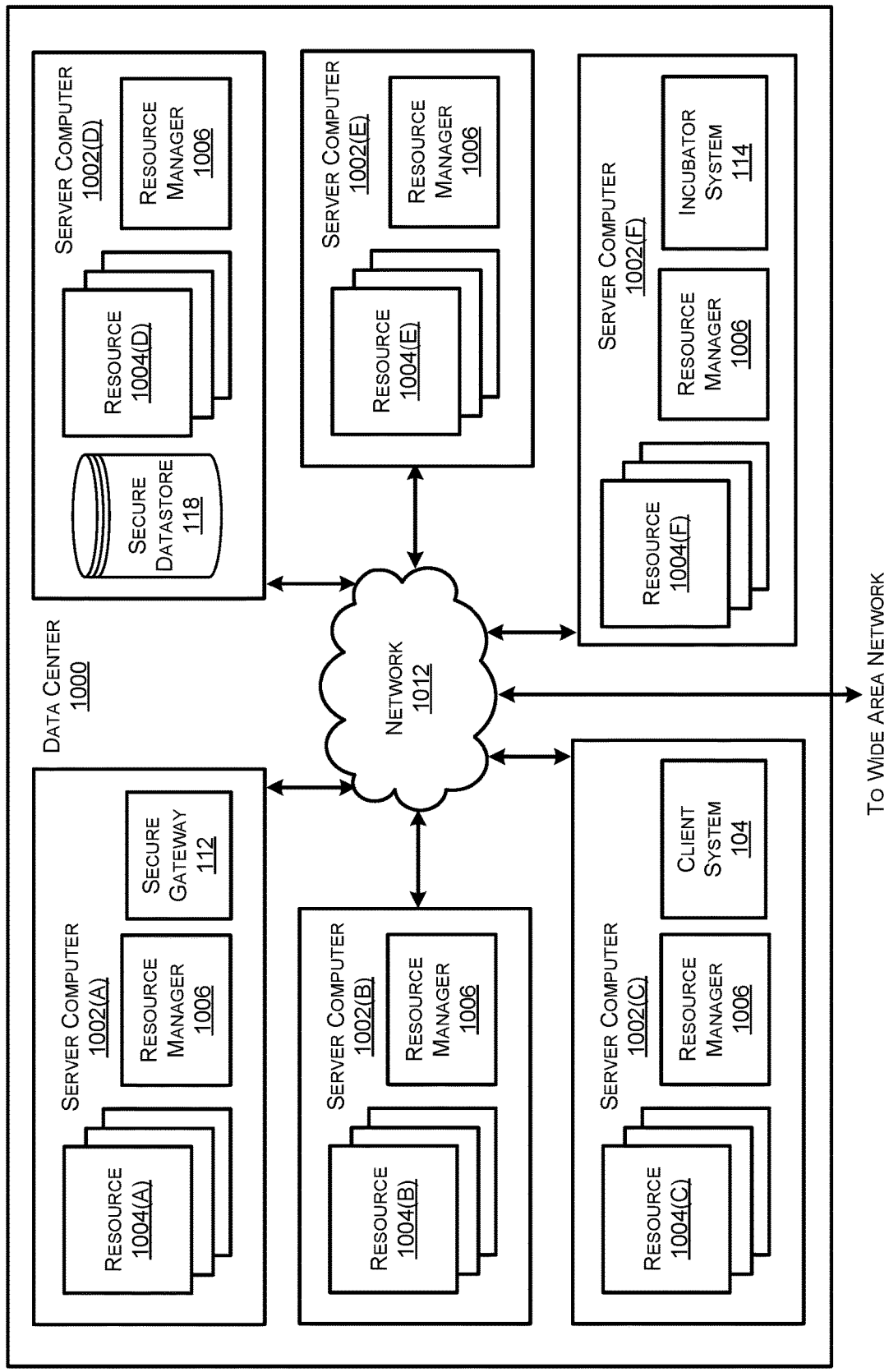
FIG. 10 is a computing system diagram illustrating a configuration for a data center that can be utilized to implement aspects of the technologies disclosed herein.

FIG. 10 is a computing system diagram illustrating a configuration for a data center 1000 that can be utilized to implement aspects of the technologies disclosed herein. The example data center 1000 shown in FIG. 10 includes several server computers 1002(A)-1002(F) (which might be referred to herein singularly as "a server computer 1002" or in the plural as "the server computers 1002") for providing computing resources 1004(A)-1004(F). In some examples, the resources 1004 and/or server computers 1002 may include, be included in, or correspond to, the service-provider network 102 described above with reference to FIG. 1.

The server computers 1002 can be standard tower, rackmount, or blade server computers configured appropriately for providing the computing resources described herein (illustrated in FIG. 10 as the resources 1004(A)-1004(F)). As mentioned above, the service-provider network 102 can accommodate virtualized resources such as VM instances, as well as hardware computing systems, database clusters, computing clusters, storage clusters, data storage resources, database resources, networking resources, and other types of computing elements. Server computers 1002 in the data center 1000 can also be configured to provide network services and other types of services.

The server computers 1002 (i.e., server computers 1002 (A)-1002(F)) can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. At least one of the servers 1002 (i.e., server computer 1002(F)) may further execute the client system 104, the secure gateway 112, the incubator system 114, and the secure datastore 118.

In the example data center 1000 shown in FIG. 10, an appropriate network 1012 is also utilized to interconnect the server computers 1002(A)-1002(F). It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 902-1 to 902-$p$ (described above with reference to FIG. 9), between each of the server computers 1002(A)-1002(F) in the data center 1000. It should be appreciated that the configuration of the data center 1000 described with reference to FIG. 10 is merely illustrative and that other implementations can be utilized.

Server computers 1002(A) to 1002(F) can execute some or all of the software components described above. For example, the server computer 1002(A) may execute the secure gateway 112, the service computer 1002(C) may execute the client system 104, the service computer 1102(D) may include the secure datastore 118, and the server computer 1002(F) may execute the incubator system 114. The server computer 1002(F) can also be configured to execute other components and/or to store data for providing some or all of the functionality described herein. In this regard, it should be appreciated that the services illustrated in FIG. 10 as executing on the server computer 1002(F) can execute on many other physical or virtual servers in the data centers 902 in various embodiments.

Figure 11:
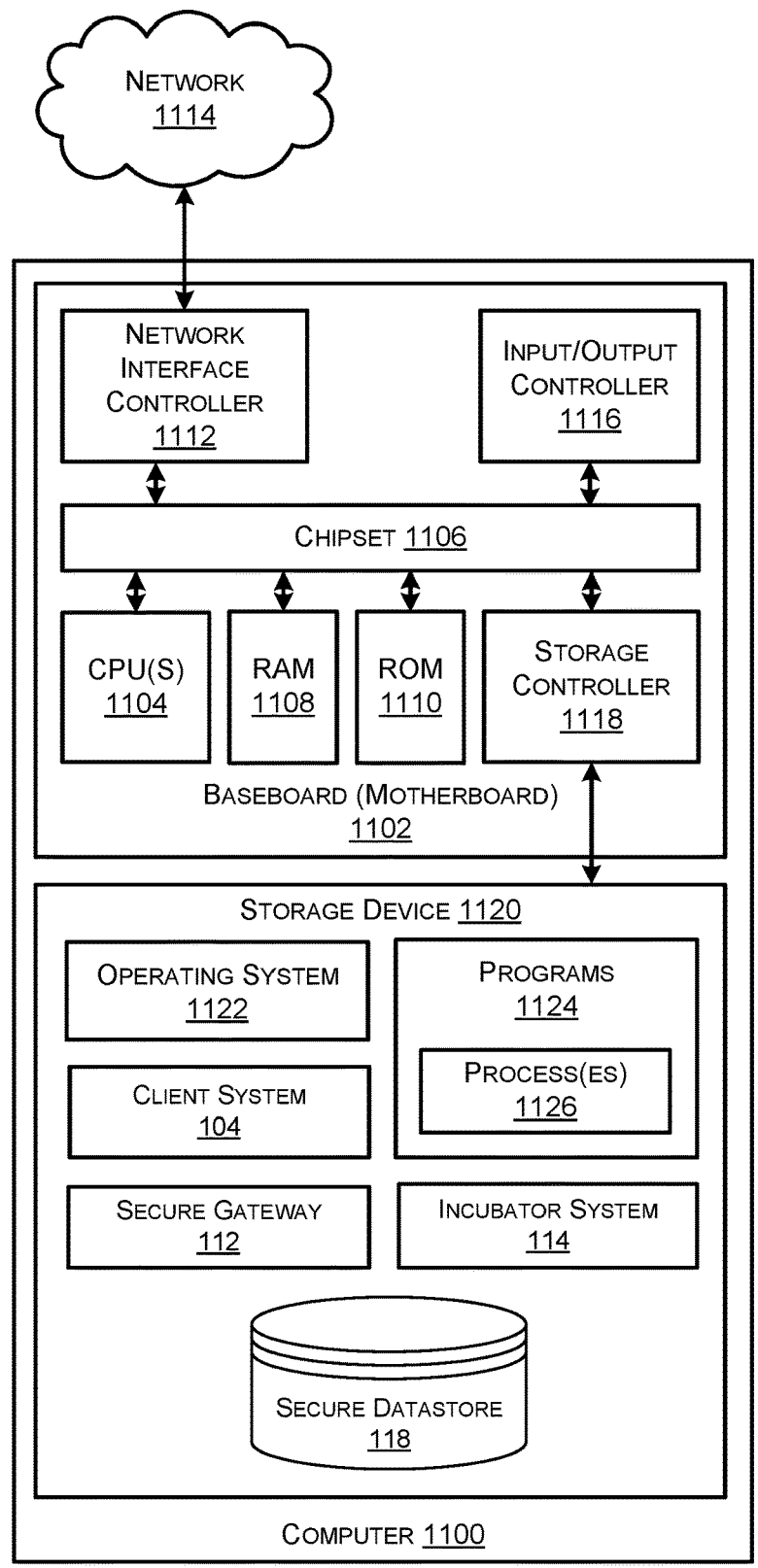
FIG. 11 is a computer architecture diagram showing an illustrative computer hardware architecture for implementing a computing device that can be utilized to implement aspects of the various technologies presented herein.

FIG. 11 is a computer architecture diagram showing an illustrative computer hardware architecture for implementing a computing device that can be utilized to implement aspects of the various technologies presented herein. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more CPUs 1104 operate in conjunction with a chip set 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 1106 provides an interface between the CPUs 1104 and the remainder of the components and devices on the baseboard 1102. The chipset 1106 can provide an interface to Random Access Memory (RAM) 1108, used as the main memory in the computer 1100. The chipset 1106 can further provide an interface to a computer-readable storage medium such as a Read-Only Memory (ROM) 1110 or Non-Volatile RAM (NVRAM) for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network 1114. In various implementations, the network 1114 can include at least one of a cloud-based network, a Local Area Network (LAN), or a Wide Area Network (WAN). The chipset 1106 can include functionality for providing network connectivity through a Network Interface Controller (NIC) 1112, such as a gigabit Ethernet adapter. The NIC 1112 may be capable of connecting the computer 1100 to other computing devices over the network 1114. It should be appreciated that multiple NICs 1112 can be present in the computer 1100, connecting the computer 1100 to other types of networks and remote computer systems.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device.

The computer 1100 can include and/or be connected to a mass storage device 1120 that provides non-volatile storage for the computer. The mass storage device 1120 can store an operating system 1122, programs 1124 (e.g., processes 1126), as well as the client system 104, the secure gateway 112, the incubator system 114, and the secure datastore 118, which have been described in greater detail herein. The mass storage device 1120 can be connected to the computer 1100 through a storage controller 1118 connected to the chipset 1106. The mass storage device 1120 can consist of one or more physical storage units. The storage controller 1118 can interface with the physical storage units through a Serial Attached SCSI (SAS) interface, a Serial Advanced Technology Attachment (SATA) interface, a Fiber Channel (FC) interface, or other type of interface for physically connecting and transferring data between computers and physical storage units.

The computer 1100 can store data on the mass storage device 1120 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1120 is characterized as primary or secondary storage, and the like.

For example, the computer 1100 can store information to the mass storage device 1120 by issuing instructions through the storage controller 1118 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1120 by detecting the physical states or characteristics of one or more particular locations within the physical storage units.

In addition to the mass storage device 1120 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service-provider network 102 described above with reference to FIGS. 1 and 9, and or any components included therein, may be supported by one or more devices similar to computer 1100. Stated otherwise, some or all of the operations performed by the service-provider network 102, and or any components included therein, may be performed by one or more computer devices 1100 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1120 can store an operating system 1122 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1120 can store other system or application programs and data utilized by the computer 1100.

In one embodiment, the mass storage device 1120 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes described above with regard to FIGS. 1 to 10. The computer 1100 can also include computer-readable storage media having instructions stored thereupon for performing any of the other computer-implemented operations described herein.

It will be appreciated that the computer 1100 might not include all of the components shown in FIG. 11, can include other components that are not explicitly shown in FIG. 11, or might utilize an architecture completely different than that shown in FIG. 11.

Further, in some implementations, the computer 1100 may correspond to a server configured to host one or more virtualized resources at a time. In some cases in which the computer 1100 is a sever currently hosting a virtualized resource, data associated with the virtualized resource may be stored in the storage device 1018. Other architectures may be used to implement the described functionalities and are also intended to be within the scope of this disclosure. Furthermore, although specific distributions of responsibilities are defined above for purposes of discussion, the various functions and responsibilities might be distributed and divided in different ways, depending on circumstances.

The environment and individual elements described herein may of course include many other logical, programmatic, and physical components, of which those shown in the accompanying figures are merely examples that are related to the discussion herein. Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An incubator system hosted by a service-provider network, the incubator system comprising:
   at least one processor; and
   memory storing one or more computer-executable instructions that, when executed by the at least one processor, cause the incubator system to perform operations comprising:
      receiving, from a client system that is isolated from the incubator system, encrypted confidential data comprising one or more entries of a form input by a user and encrypted according to a first encryption scheme;
      receiving, from the client system, an indication of a validation operation for confirming that the one or more entries are in a particular format;
      receiving, from the client system, an encryption key;
      generating plaintext data by decrypting the encrypted confidential data;
      generating validated data by confirming that the one or more entries in the plaintext data are in the particular format based on the validation operation;
      generating encrypted validated data by encrypting the validated data according to a second encryption scheme using the encryption key; and
      providing, to the client system, the encrypted validated data.

2. The incubator system of claim 1, the one or more computer-executable instructions being one or more first computer-executable instructions, the operations being first operations, wherein the memory comprises a datastore, and
   wherein the memory stores one or more second computer-executable instructions that, when executed by the at least one processor, cause the incubator system to perform second operations comprising:
      receiving, from the client system, a third instruction to store the encrypted validated data in the datastore;
      based on the third instruction, storing the encrypted validated data in the datastore;
      receiving, from the client system, a request for the encrypted validated data;
      based on the request, providing, to the client system, a copy of the encrypted validated data; and
      within a threshold time period of storing the encrypted validated data in the datastore, overwriting the encrypted validated data stored in the datastore with at least one null value.

3. The incubator system of claim 1, the one or more computer-executable instructions being one or more first computer-executable instructions, the operations being first operations, wherein the memory stores one or more second computer-executable instructions that, when executed by the at least one processor, cause the incubator system to perform second operations comprising:
   receiving, from the client system, a third instruction to transform the validated data from a first format to a second format; and
   based on the third instruction, transforming the validated data from the first format to the second format,
   wherein generating the encrypted validated data comprises encrypting the validated data in the second format according to the second encryption scheme using the encryption key.

4. A method comprising:
   receiving, by a first component executed by a service provider network and from a second component executed by the service-provider network, an indication of an operation to be performed on plaintext data without the second component having access to the plaintext data, the second component being isolated from the first component in the service-provider network, the operation comprising at least a validation operation associated with validating that the plaintext data is in a format;
   receiving, by the first component and from the second component, first encrypted data;
   generating, by the first component, the plaintext data by decrypting the first encrypted data;
   generating, by the first component, processed data by performing the operation on the plaintext data;
   generating, by the first component, second encrypted data by encrypting the processed data; and
   sending, by the first component and to the second component, the second encrypted data.

5. The method of claim 4, wherein the first component is an incubator system that is hosted by first computing resources in a service-provider network, the second component is a client system that is hosted by second computing resources in the service-provider network, and the first computing resources are different than the second computing resources.

6. The method of claim 4, wherein generating the plaintext data is performed without storing the plaintext data and without exposing the plaintext data to the second component.

7. The method of claim 4, wherein the operation further comprises at least one of an encryption operation associated with encrypting the plaintext data into ciphertext data or a storage operation associated with storing the ciphertext data.

8. The method of claim 4, wherein performing the operation on the plaintext data comprises converting the plaintext data from the first format to a second format that is different than the format.

9. The method of claim 4, wherein the first encrypted data comprises confidential user data encrypted according to a first encryption scheme, and
   wherein generating the second encrypted data comprises encrypting the processed data according to a second encryption scheme that is different than the first encryption scheme.

10. The method of claim 9, wherein the first encrypted data comprises one or more entries of a form input by a user, and
   wherein the form is output on a device associated with the user via at least one of a website, a web-based application, or a mobile application hosted by the service-provider network.

11. The method of claim 4, further comprising:
   storing the second encrypted data in a datastore; and
   within a time period of storing the second encrypted data in the datastore, overwriting the second encrypted data with one or more null values in the datastore.

12. The method of claim 10, further comprising:
   receiving, by the first component and from the second component, a request for the second encrypted data;
   based at least in part on receiving the request, accessing the second encrypted data in a datastore; and
   sending, by the first component and to the second component, a copy of the second encrypted data accessed in the datastore.

13. A system comprising:

at least one processor; and memory storing one or more first instructions that, when executed by the at least one processor, cause the system to perform first operations comprising:

receiving, by a first component of a service-provider network and from a second component of the service-provider network, first encrypted data, the first encrypted data comprising confidential user data in a ciphertext format;

sending, by the first component and to a third component of the service-provider network that is isolated from the first component, the first encrypted data;

sending, by the first component to the third component, a second instruction to perform a second operation on the confidential user data without exposing the confidential user data to the first component in a plaintext format the second operation comprising at least a validation operation associated with validating that the confidential user data is in a format;

based at least in part on sending the first encrypted data and sending the second instruction, receiving, by the first component and from the third component, second encrypted data; and sending, by the first component and to an external system outside of the service-provider network, the second encrypted data.

14. The system of claim 13, wherein the third component is an incubator system that is hosted by first computing resources in the service-provider network, the first component is a client system that is hosted by second computing resources in the service-provider network, and the first computing resources are different than the second computing resources.

15. The system of claim 13, wherein the second operation comprises at least one of a transformation operation associated with converting the confidential user data from the format to a second format that is different than the format, an encryption operation associated with encrypting the plaintext confidential user data into ciphertext data, or a storage operation associated with storing the ciphertext data.

16. The system of claim 13, wherein the first encrypted data is encrypted according to a first encryption scheme and the second encrypted data is encrypted according to a second encryption scheme, the first encryption scheme being different than the second encryption scheme.

17. The system of claim 13, wherein the memory further stores one or more third instructions that, when executed by the at least one processor, cause the system to perform third operations comprising:

sending, by the first component, a form to a user device that is outside of the service-provider network, and wherein the confidential user data comprises one or more entries of the form input by a user.

18. The system of claim 13, wherein the second instruction is to store the second encrypted data in a data store for at least a minimum time period and less than or equal to a maximum time period.

19. The system of claim 18, wherein the memory further stores one or more third instructions that, when executed by the at least one processor, cause the system to perform third operations comprising:

determining that the external system failed to receive the second encrypted data;

based at least in part on determining that the external system failed to receive the second encrypted data, sending, by the first component and to the third component, a request for the second encrypted data; and based at least in part on sending the request:

receiving, by the first component, the second encrypted data; and sending, by the first component and to the external system, the second encrypted data.

20. The system of claim 18, wherein the memory further stores one or more third instructions that, when executed by the at least one processor, cause the system to perform third operation comprising:

determining that the external system successfully received the second encrypted data; and based at least in part on determining that the external system successfully received the second encrypted data, sending, by the first component and to the third component, a request to cease storing the second encrypted data.

* * * * *